(12) United States Patent
Nemoto et al.

(10) Patent No.: US 8,778,484 B2
(45) Date of Patent: Jul. 15, 2014

(54) LAMINATED POLYESTER FILM AND ANTIREFLECTION FILM

(75) Inventors: Masami Nemoto, Otsu (JP); Mitsuhiro Horiuchi, Otsu (JP); Yasushi Takada, Otsu (JP)

(73) Assignee: Toray Industries, Inc. (JP)

( * ) Notice: Subject to any disclaimer, the term of this patent is extended or adjusted under 35 U.S.C. 154(b) by 326 days.

(21) Appl. No.: 12/994,351

(22) PCT Filed: May 18, 2009

(86) PCT No.: PCT/JP2009/059112
§ 371 (c)(1),
(2), (4) Date: Dec. 1, 2010

(87) PCT Pub. No.: WO2009/145075
PCT Pub. Date: Dec. 3, 2009

(65) Prior Publication Data
US 2011/0070416 A1    Mar. 24, 2011

(30) Foreign Application Priority Data
May 28, 2008  (JP) .................. 2008-139112

(51) Int. Cl.
| B32B 7/02 | (2006.01) |
| B32B 27/08 | (2006.01) |
| B32B 27/36 | (2006.01) |

(52) U.S. Cl.
USPC ............................ 428/212; 428/220

(58) Field of Classification Search
CPC ............ B32B 27/36; B32B 27/08; B32B 7/02
USPC ...................... 428/212, 220, 411.1
See application file for complete search history.

(56) References Cited

U.S. PATENT DOCUMENTS

| 2005/0261389 | A1 * | 11/2005 | Bratolavsky et al. | ........... 522/71 |
| 2007/0013843 | A1 * | 1/2007 | Nishikouji et al. | ........... 349/119 |

FOREIGN PATENT DOCUMENTS

| JP | 10-110091 A | 4/1998 |
| JP | 2003-251750 A | 9/2003 |
| JP | 2004-054161 A | 2/2004 |
| JP | 2005-097571 A | 4/2005 |
| JP | 2006-258897 A | 9/2006 |
| JP | 2009-84488 A | 4/2009 |
| JP | 2009-096181 A | 5/2009 |
| JP | 2009-126042 A | 6/2009 |
| JP | 2009-126043 A | 6/2009 |

* cited by examiner

*Primary Examiner* — Aaron Austin
*Assistant Examiner* — Lawrence Ferguson
(74) *Attorney, Agent, or Firm* — DLA Piper LLP (US)

(57) ABSTRACT

A laminated polyester film includes a layer (S) of polyester and a layer (C) including a polyester resin (A) having a fluorene backbone, wherein a surface of the layer (C) has an adhesive index after a heat and wet test of 3 to 5.

14 Claims, No Drawings

LAMINATED POLYESTER FILM AND ANTIREFLECTION FILM

RELATED APPLICATIONS

This is a §371 of International Application No. PCT/JP2009/059112, with an international filing date of May 18, 2009 (WO 2009/145075 A1, published Dec. 3, 2009), which is based on Japanese Patent Application No. 2008-139112, filed May 28, 2008, the subject matter of which is incorporated by reference.

TECHNICAL FIELD

This disclosure relates to a laminated polyester film that effectively depresses the formation of interference patterns when used as base for an antireflection film and achieves good adhesion to a hard coating agent formed of active line-curable resin, and also relates to an anti-reflection film with at least one side laminated with a hard coat layer of active line-curable resin.

BACKGROUND

Laminated films with a hard coat layer provided over the film surface have been widely used in manufacturing antireflection film, film for touch panels, and film for face plates.

In recent years, markets have been rapidly expanding for flat panel displays (FPD) such as liquid crystal displays (LCD), plasma displays (PDP), and organic electroluminescent (organic EL) displays, and there are increasing demands for products with a larger screen and high definition. Accordingly, development of components with highly advanced functions has been strongly called for to serve in manufacturing these products.

In such circumstances, most of the conventional antireflection films to reduce the surface reflection on these displays consist of a base film of triacetate or polyester coated with a hard coat layer and further covered with a high refractive index layer and then a low refractive index layer so that interface reflections between these layers are cancelled to reduce the overall reflection.

However, antireflection films with a lower reflectance, smaller thickness, and lower price have been required more strongly, and accordingly, and increased efforts have recently been made toward developing novel antireflection films consisting of a polyester film directly coated with a hard coat layer with a high refractive index and further covered with a low reflectance layer. Antireflection films of such a structure, however, tend to suffer interference patterns caused by insufficient adhesion, difference in refractive index between the film and the hard coat layer, and uneven thickness, leading to visibility problems. If an adhesion layer is formed over the polyester film with the aim of improving the adhesive property, improved adhesive property will actually be achieved, but such an adhesion layer generally has a lower refractive index that the polyester film used as base material, and consequently the difference in refractive index between the adhesion layer and the hard coat layer, which has a high refractive index, will further increase. Thus, there remains the difficulty in eliminating the interference pattern.

To control the interference pattern that develops when a hard coat layer with a high refractive index is formed over the polyester film, a study has proposed a method in which monomers containing an aromatic substituent group, such as fluorene group, are copolymerized with the resin of the adhesion layer to increase the refractive index of the resin itself (Japanese Unexamined Patent Publication (Kokai) No. HEI-10-110091). However, when using a so-called in-line coating process in which a polyester film that is not fully crystal-oriented is subjected to corona discharge treatment as needed, followed by coating with an adhesive coating material, drying, stretching, and heat treatment to complete the crystalline orientation, a high refractive index resin commonly has a rigid chemical structure although a water dispersion of the highly refractive resin is necessary. A highly hydrophilic sulfonate group has to be used in large amounts to disperse water in the resin, leading to poor adhesion under high temperature and high humidity conditions. Furthermore, a resin copolymerized with a fluorene group generally has a high glass transition temperature and cannot be stretched smoothly, leading to poor spreadability in an in-line coating process and fine cracks in the adhesion layer to cause undesired haze in the film.

Another study focuses on developing an adhesion layer containing highly refractive fine particles of metal oxide, such as titanium oxide, to prepare a polyester film provided with an adhesion layer with an increased refractive index (Japanese Unexamined Patent Publication (Kokai) No. 2004-54161). If it is applied to a common in-line process, however, problems tend to take place such as surface scattering by particle projections and formation of voids between coagulated particles or at the interface between particles and the binder interface, causing undesired haze in the film.

Another study focuses on developing an adhesion layer containing a water-soluble titanium chelate compound or zirconium compound to prepare a polyester film provided with an adhesion layer with an increased refractive index (Japanese Unexamined Patent Publication (Kokai) No. 2005-97571). However, such chelate compounds generally contain only small quantities of titanium and zirconium, and large amounts of these chelate compounds have to be added to improve the refractive index. These metal chelate compounds can decompose during heat treatment, and the decomposition products will form undesired material in the adhesion layer under some conditions, leading to an antireflection film with decreased quality.

It could therefore be helpful to provide an optical-purpose adhesion film that serves to reduce the interference pattern and develops good adhesion to the hard coat layer when used as base of an antireflection film. It could also be helpful to provide a laminated polyester film that has good characteristics including high refractive index, high strength, and high heat resistance, shows good adhesion under high temperature and high humidity conditions, and achieves a high-level spreadability in in-line coating processes, in addition to having the ability to reduce the interference pattern.

SUMMARY

We thus provide:
(1) A laminated polyester film comprising a layer (layer S) of polyester and a layer (layer C) containing a polyester resin (A) having a fluorene backbone, wherein the surface of layer C has an adhesive index after a heat and wet test in the range of 3 or more and 5 or less.
(2) A laminated polyester film as specified in Paragraph (1), wherein polyester resin (A) either contains no dicarboxylic acid component (Aa-3) having a sulfonate group or contains it up to less than 0.1 mol % relative to the dicarboxylic acid component (Aa) that constitutes the polyester resin (A).
(3) A laminated polyester film as specified in either Paragraph (1) or (2), wherein layer C contains a cross linking agent (B) and the ratio of the content (a) of the polyester resin (A) to the content (b) of the cross linking agent (B) in the layer C, i.e. (a)/(b), is in the range of 70/30 or more and 95/5 or less.

(4) A laminated polyester film as specified in any of Paragraphs (1) to (3), wherein the cross linking agent (B) is one or more cross linking agents selected from the group of melamine-based cross linking agents, oxazoline-based cross linking agents, and carbodiimide-based cross linking agents.

(5) A laminated polyester film as specified in any of Paragraphs (1) to (4), wherein the spectral reflectivity at a wavelength of 550 nm is 6.0 to 8.3%.

(6) A laminated polyester film as specified in any of Paragraphs (1) to (5), wherein layer C has a layer thickness of 2 to 20 nm.

(7) An antireflection film comprising a laminated polyester film as specified in any of Paragraphs (1) to (6), that is laminated with a high refractive index hard coat layer of an active line-cured resin, and a low refractive index layer formed on top thereof.

(8) An antireflection film as specified in Paragraph (7), wherein the high refractive index hard coat layer has a refractive index of 1.63 to 1.75 whereas the low refractive index layer has a refractive index of 1.35 to 1.40.

The laminated polyester film can reduce the pattern interference when a hard coat layer of an active energy line-cured resin is formed over the layer C surface, and develops good initial adhesive property to the hard coat layer and adhesive property after a wet test under high temperature and high humidity conditions. An antireflection film consisting of the laminated film additionally laminated with a high refractive index hard coat layer and a low refractive index layer has good antireflection property to reduce the interference pattern and reflection of outside light and good adhesive property after a wet test under high temperature and high humidity conditions.

DETAILED DESCRIPTION

It is necessary for the laminated polyester film to consist of a layer (layer S) formed of polyester as base and a layer (layer C) containing a polyester resin (A) having a fluorene backbone.

The polyester that constitutes the layer (layer S) formed of polyester as base refers generically to polymers in which an ester bond works as a major bond in the backbone chain, and the polyester is preferably composed primarily of at least one component selected from the group of ethylene terephthalate, ethylene-2,6-naphthalate, butylene terephthalate, and ethylene-α,β-bis(2-chlorophenoxy)ethane-4,4'-dicarboxylate.

The components may be used either singly or in combination, but the use of a polyester comprising ethylene terephthalate as major component is particularly preferable in view of overall properties including quality and economic efficiency. The use of polyethylene-2,6-naphthalate, which is high in heat resistance and rigidity, is more preferable for uses where heat is applied to the base.

The polyester may be copolymerized partly or up to preferably 20 mol % or less with other dicarboxylic acid components or diol components.

The intrinsic viscosity of the polyester is preferably in the range of 0.4 to 1.2 dl/g, more preferably 0.5 to 0.8 dl/g (as measured in o-chlorophenol at 25° C. according to JIS K 7367 (2000)).

In addition, the polyester may contain various additives including, for instance, antioxidant, thermal stabilizer, weather stabilizer, ultraviolet light absorber, organic lubricant, pigment, dye, organic or inorganic fine particles, filler, antistatic agent, nucleus formation agent, and cross linking agent, unless they do not cause deterioration of characteristics. In particular, addition of fine particles can decrease transparency-related characteristics such as light transmission and haze. Therefore, the diameter of the particles, if added, should be as small as possible, and it is preferable that the particle diameter is about ¼ or less of the wavelength range of visible light where scattering does not take place easily and that their content is very small.

A biaxially oriented polyester film is preferably used as the layer S of polyester. A biaxially oriented film refers to a film that shows a biaxially oriented pattern in wide angle X-ray diffraction observation. Generally, a biaxially oriented polyester film can be produced by stretching an unstretched polyester sheet up to 2.5 to 5 times in the sheet's length direction and width direction, respectively, followed by heat treatment to complete the crystal orientation.

The layer S itself has a laminated structure of two or more layers. The laminated structure may be, for instance, a composite film consisting of an inner layer and a surface layer, in which the inner layer is virtually free of particles and the surface layer containing particles. The inner layer and the surface layer may be formed of an identical polymer or chemically different polymers. For manufacturing of display panels, which is the main purpose of the invention, the layer S is preferably free of particles to maintain good optical characteristics such as transparency.

There are no specific limitations on the layer thickness of the layer S which serves as base, and may be appropriately determined, but it is commonly in the range of 10 to 500 μm, preferably 20 to 300 μm.

It is necessary for the laminated polyester film to have a layer (layer C) containing a polyester resin (A) having a fluorene backbone, in addition to the layer S.

The polyester resin (A) having a fluorene backbone refers to a polyester resin that contains an ester bond in either its backbone chain or side chain, and can be produced according to the process I) or II) described below. Both processes I) and II) may be used in combination, i.e., condensation polymerization of a dicarboxylic acid component (Aa), glycol component (Ab), and component (Ac).

I) Condensation polymerization of a dicarboxylic acid component (Aa) and a glycol component (Ab).

II) Condensation polymerization of a component comprising one or more alcohol-based functional group (hydroxyl group) and a component (Ac) comprising one or more carboxyl groups.

In process I), there are two types of dicarboxylic acid component (Aa), namely, the dicarboxylic acid component (Aa-1) having a fluorene backbone and the dicarboxylic acid component (Aa-2) free of a fluorene backbone. There are two types of glycol component (Ab), namely, the glycol component (Ab-1) having a fluorene backbone and the glycol component (Ab-2) free of a fluorene backbone. To introduce a fluorene backbone into the polyester resin (A), it is necessary for the resin to be copolymerized with a dicarboxylic acid component (Aa-1) having a fluorene backbone and/or a glycol component (Ab-1) having a fluorene backbone.

In process II), there are two types of component (Ac), namely, the component (Ac-1) having a fluorene backbone and the component (Ac-2) free of a fluorene backbone. To introduce a fluorene backbone into the polyester resin (A), it is necessary for the resin to be copolymerized with a component (Ac-1) having a fluorene backbone.

The process I) where a polyester resin (A) having a fluorene backbone (hereinafter, sometimes referred to as fluorene copolymerized polyester resin (A)) is described in detail below, but the process II) can also be carried out by a similar procedure.

The dicarboxylic acid component (Aa) may be an ester-forming derivative that is produced by alkyl esterification of a dicarboxylic acid. The dicarboxylic acid component (Aa) may also be a higher-valent carboxylic acid such as trivalent or more one, as well as the narrowly-defined dicarboxylic acid. The dicarboxylic acid component (Aa) may also be an anhydride.

The glycol component (Aa) may be a trivalent or more polyol, as well as the narrowly-defined glycol.

The dicarboxylic acid components (Aa-1) having a fluorene backbone include, but not limited to, 9,9-bis(t-butoxy carbonyl methyl)fluorene, 9,9-bis[2-(t-butoxy carbonyl) ethyl]fluorene, 9,9-bis[1-(t-butoxy carbonyl)ethyl]fluorene, 9,9-bis[2-(t-butoxy carbonyl)-1-cyclohexyl ethyl]fluorene, 9,9-bis[2-(t-butoxy carbonyl)-1-phenyl ethyl]fluorene, 9,9-bis[1-(t-butoxy carbonyl)propyl]fluorene, 9,9-bis[2-(t-butoxy carbonyl)propyl]fluorene, 9,9-bis[2-(t-butoxy carbonyl)-1-methyl ethyl]fluorene, 9,9-bis[2-(t-butoxy carbonyl)-1-methyl propyl]fluorene, 9,9-bis[2-(t-butoxy carbonyl) butyl]fluorene, 9,9-bis[2-(t-butoxy carbonyl)-1-methyl-butyl]fluorene, and 9,9-bis[5-(t-butoxy carbonyl)pentyl] fluorine.

The useful dicarboxylic acid components (Aa-2) free of a fluorene backbone include aromatic, aliphatic, or alicyclic dicarboxylic acids and trivalent or higher-valent carboxylic acids that do not contain a fluorene backbone. The useful dicarboxylic acid components (Aa-2) include terephthalic acid, isophthalic acid, orthophthalic acid, phthalic acid, 2,5-dimethyl terephthalic acid, 1,4-naphthalene dicarboxylic acid, biphenyl dicarboxylic acid, 2,6-naphthalene dicarboxylic acid, 1,2-bis phenoxy ethane-p,p'-dicarboxylic acid, and phenyl indan dicarboxylic acid. The useful aliphatic and alicyclic dicarboxylic acids include succinic acid, adipic acid, sebacic acid, dodecanedioic acid, dimer acid, 1,3-cyclopentane dicarboxylic acid, 1,2-cyclohexanedicarboxylic acid, 1,4-cyclohexanedicarboxylic acid, and ester forming derivatives thereof.

The glycol components (Ab-1) having a fluorene backbone include, but are not limited to, 9,9-bis[4-(2-hydroxy ethoxy) phenyl]fluorene, 9,9-bis[4-(2-hydroxy ethoxy)-3-methyl phenyl]fluorene, 9,9-bis[4-(2-hydroxy ethoxy)-3,5-dimethyl phenyl]fluorene, 9,9-bis[4-(2-hydroxy ethoxy)-3-ethyl phenyl]fluorene, 9,9-bis[4-(2-hydroxy ethoxy)-3,5-diethyl phenyl]fluorene, 9,9-bis[4-(2-hydroxy ethoxy)-3-propyl phenyl] fluorene, 9,9-bis[4-(2-hydroxy ethoxy)-3,5-dipropyl phenyl] fluorene, 9,9-bis[4-(2-hydroxy ethoxy)-3-isopropyl phenyl] fluorene, 9,9-bis[4-(2-hydroxy ethoxy)-3,5-diisopropyl phenyl]fluorene, 9,9-bis[4-(2-hydroxy ethoxy)-3-n-butyl phenyl]fluorene, 9,9-bis[4-(2-hydroxy ethoxy)-3,5-di-n-butyl phenyl]fluorene, 9,9-bis[4-(2-hydroxy ethoxy) 10-3-isobutyl phenyl]fluorene, 9,9-bis[4-(2-hydroxy ethoxy)-3,5-diisobutyl phenyl]fluorene, 9,9-bis[4-(2-hydroxy ethoxy)-3-(1-methyl propyl)phenyl]fluorene, 9,9-bis[4-(2-hydroxy ethoxy)-3,5-bis(1-methyl propyl)phenyl]fluorene, 9,9-bis[4-(2-hydroxy ethoxy)-3-phenyl phenyl]fluorene, 9,9-bis[4-(2-hydroxy ethoxy)-3,5-diphenyl phenyl]fluorene, 9,9-bis[4-(2-hydroxy ethoxy)-3-benzyl phenyl]fluorene, 9,9-bis[4-(2-hydroxy ethoxy)-3,5-dibenzyl phenyl]fluorene, 9,9-bis[4-(3-hydroxy propoxy)phenyl]fluorine, and 9,9-bis[4-(4-hydroxy butoxy)phenyl]fluorene.

The glycol components (Ab-2) free of a fluorene backbone include, but are not limited to, ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethyl hexane-1,3-diol, neopentyl glycol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexanedimethanol, 1,3-cyclohexanedimethanol, 1,4-cyclohexanedimethanol, 2,2,4,4-tetra methyl-1,3-cyclobutanediol, 4,4'-thiodiphenol, bisphenol A, 4,4'-methylene diphenol, 4,4'-(2-norbornylidene)diphenol, 4,4'-dihydroxy biphenol, o-, m-, and p-dihydroxy benzene, 4,4'-isopropylidene phenol, 4,4'-isopropylidene bindiol, cyclopentane-1,2-diol, cyclohexane-1,2-idols, and cyclohexane-1,4-idols.

In the fluorene copolymerized polyester resin (A), the copolymerized dicarboxylic acid component (Aa-1) having a fluorene backbone preferably accounts for 40 mol % or more, more preferably 80 mol % or more, relative to the dicarboxylic acid component (Aa) that constitutes the fluorene copolymerized polyester resin (A). There are no specific limitations on the upper limit on the content, but it is preferably 95 mol % or less.

In the fluorene copolymerized polyester resin (A), the copolymerized glycol component (Ab-1) having a fluorene backbone preferably accounts for 40 mol % or more, more preferably 80 mol % or more, relative to the glycol component (Ab) that constitutes the fluorene copolymerized polyester resin (A). There are no specific limitations on the upper limit on the content, but it is particularly preferably 95 mol % or less.

If the copolymerized components accounts for less than 40 mol %, the fluorene copolymerized polyester resin (A) will fail to have a sufficiently high refractive index, possibly leading to an interference pattern when the film is laminated a hard coat layer. There are no specific limitations on the upper limit, but the fluorene copolymerized polyester resin (A) will have an excessively high glass transition temperature if the copolymerized components accounts for more than 95 mol %, leading to low stretchability and poor handleability. As described below, when a layer C is formed by an in-line coating process, a sufficient stretchability will not be likely to be achieved, making it impossible to form a uniform layer C.

In the fluorene copolymerized polyester resin (A), the copolymerized dicarboxylic acid component (Aa-1) having a fluorene backbone and the copolymerized glycol component (Ab-1) having a fluorene backbone preferably account for 20 mol % or more, more preferably 40 mol % or more, relative to the dicarboxylic acid component (Aa) and the glycol component (Ab) that constitute the fluorene copolymerized polyester resin (A), which account for 100 mol %. There are no specific limitations on the upper limit on the content, but it is particularly preferably 50 mol % or less.

The laminated film can be prepared by coating the surface of the layer S with an aqueous coating agent containing the fluorene copolymerized polyester resin (A), followed by drying and heating to produce a layer C.

To produce an aqueous coating agent containing fluorene copolymerized polyester resin (A), it is preferable that the fluorene copolymerized polyester resin (A) is water-soluble. To make the fluorene copolymerized polyester resin (A) water-soluble, it is preferable that a hydrophilic component such as a compound containing a carboxylate group or a compound containing a sulfonate group is introduced into the side chain or the like of the polyester resin (A). This introduction of a hydrophilic component can be achieved by using a dicarboxylic acid component (Aa-3) with sulfonate group or a trivalent or higher-valent carboxylic acid component (Aa-4) as the dicarboxylic acid component (Aa).

The useful dicarboxylic acid components (Aa-3) having a sulfonate group include, for instance, alkali metal salts, alkaline earth metal salts or the like of sulfoisophthalic acid, 5-sulfoisophthalic acid, 4-sulfophthalic acid, and 4-sulfonaphthalene-2,7dicarboxylic 5-[4-sulfophenoxy]isophthalic acid.

The useful trivalent or higher-valent carboxylic acid components (Aa-4) include higher-valent carboxylic acids including trimellitic acid, and anhydrides thereof. Specifically, they include trimellitic anhydride, 1,2,4,5-butane tetracarboxylic dianhydride (pyromellitic anhydride), 1,2,3,4-pentane tetracarboxylic dianhydride, 3,3',4,4'-benzophenone tetracarboxylic dianhydride, 5-(2,5-dioxotetrahydrofurfuryl)-3-methyl-3-cyclohexene-1,2-dicarboxylic anhydride, 5-(2,5-dioxotetrahydrofurfuryl)-3-cyclohexene-1,2-dicarboxylic anhydride, cyclopentane tetracarboxylic dianhydride, 2,3,6,7-naphthalene tetracarboxylic dianhydride, 1,2,5,6-naphthalene tetracarboxylic dianhydride, ethylene glycol bistrimellitate dianhydride, 2,2',3,3'-diphenyl tetracarboxylic dianhydride, thiophene-2,3,4,5-tetracarboxylic dianhydride, and ethylene tetracarboxylic dianhydride.

In the case of recent flat panel display products that require a good adhesive property after a wet test, however, if a sulfonate group is used as hydrophilic component of the polyester resin (A), the sulfonate group will have an excessively high hydrophilicity, possibly leading to decreased adhesion to the adherend under high temperature and high humidity conditions.

Thus, it is preferable that the fluorene copolymerized polyester resin (A) either contains no dicarboxylic acid component (Aa-3) comprising a sulfonate group or contains it up to less than 0.1 mol % relative to the quantity of the dicarboxylic acid component (Aa) that constitutes the fluorene copolymerized polyester resin (A). The dicarboxylic acid component (Aa-3) having a sulfonate group more preferably accounts for 0.05 mol % or less, and it is still more preferable that it is not contained (0 mol %).

To make the fluorene copolymerized polyester resin (A) hydrophilic (water-soluble), it is preferable that that a trivalent or higher-valent carboxylic acid component (Aa-4) is copolymerized. This copolymerization of a trivalent or higher-valent carboxylic acid component (Aa-4) allows a carboxyl group to be introduced into the side chain of the polyester resin (A). Another effective way is to neutralize the carboxyl group with ammonia, sodium hydroxide or the like to convert it into a carboxylate group. This conversion into a carboxylate group can further increase the hydrophilicity.

It is more preferable that tetracarboxylic acid is used as the trivalent or higher-valent carboxylic acid component (Aa-4). Tetracarboxylic acid contains more carboxyl groups than trivalent carboxylic acids such as trimellitic acid and, therefore, it is possible to decrease the proportion of the higher-valent carboxylic acid component (Aa-4) in the dicarboxylic acid component (Aa) of fluorene copolymerized polyester resin (A) that is necessary to make the fluorene copolymerized polyester resin (A) hydrophilic. Accordingly, in the polyester resin polymerization process, the number average molecular weight can be increased sufficiently to achieve improved contact with the hard coat layer and other adherends.

In performing the copolymerization of a higher-valent carboxylic acid component, it is preferable that a dicarboxylic acid component (Aa) and a glycol component (Ab) are reacted into a polyester polyol (polyester oligomer) which is then reacted with a trivalent or higher-valent carboxylic anhydride (Aa-4) introduce a carboxyl group into the side chain of the polyester resin (A). Use of this process serves for efficient introduction of a carboxyl group into the side chain of the polyester resin (A).

It is preferable that the quantity (Aa-4m (moles)) of the higher-valent carboxylic anhydride (Aa-4) used here is 0.5 to 1.0 times the difference between the quantity (Aam (moles)) of the glycol component (Aa) used for the esterification reaction and the quantity (Abm (moles)) of the dicarboxylic acid component, i.e., (Aam-Abm (moles)). If the ratio is less than 0.5, the adhesiveness to the base of polyester resin coated film under high temperature high humidity conditions will decrease. A ratio of more than 1.0 is not preferable either because it may be impossible to increase the number average molecular weight of the polyester.

In making the fluorene copolymerized polyester resin (A) water-soluble, a small amount of a water-soluble organic solvent may be added to improve the preservation stability and handleability of the coating material. The useful water-soluble organic solvents include water-soluble alcohols such as methyl alcohol, ethyl alcohol, and isopropyl alcohol; water-soluble ketones such as acetone; and water-soluble ethers such as methyl cellosolve, cellosolve, butyl cellosolve, carbitol, and butyl carbitol. These may be used singly or as a mixture of two or more thereof. Their content should be 10% or less, preferably 7% or less, and more preferably 5% or less, relative to the total quantity of the coating material in maintain explosion proof property and prevent environmental contamination.

Described below is a typical method to produce the fluorene copolymerized polyester resin (A). First, a polyester polyol is prepared by carried out esterification reaction of succinic acid or its ester-forming derivative as the dicarboxylic acid component (Aa-2) free of a fluorene backbone, 9,9-bis[4-(2-hydroxy ethoxy)phenyl]fluorine as the glycol component (Aa-1) having a fluorene backbone, a glycol component such as ethylene glycol as the glycol component (Ab-2) free of a fluorene backbone, and a catalyst. In this step, the quantity of the 9,9-bis[4-(2-hydroxy ethoxy)phenyl]fluorene and ethylene glycol added is preferably 1.01 to 2.0 times by mole the total quantity of the dicarboxylic acid component. For polymerization of a polyester polyol, it is required to use an excess amount of glycol component compared to the dicarboxylic acid component, making it necessary for the quantity of the glycol component to be 1.01 or more by mole the quantity of the dicarboxylic acid component. A ratio of more than 2.0 by mole is not preferable, however, because the polyester resin will not have a sufficiently high number average molecular weight distribution.

With respect to the catalyst, the useful catalyst materials include titanium-based ones such as tetraisopropyl titanate and tetra-n-butyl titanate; antimony-based ones such as antimony trioxide; germanium-based ones such as germanium dioxide; and others such as zinc acetate, manganese acetate, and dibutyl tin oxide, of which tetra-n-butyl titanate is preferable. The content of the catalyst in the dicarboxylic acid component is preferably 10 to 1,000 ppm. The reaction will not progress in some cases if it is less than 10 ppm whereas there will be no advantages such as shortened reaction time if it is more than 1,000 ppm. There are no specific limitations on the temperature and duration of this esterification reaction, and it can be carried out in a generally known range. For instance, it is commonly carried out while distilling out water or alcohol at 160 to 240° C. for about 1 to 10 hours. Subsequently, the pressure of the reaction system is gradually reduced commonly at 200 to 260° C., and the reaction is continued at 0.01 to 0.5 MPa for 0.1 to 3 hours.

Then, a higher-valent carboxylic anhydride (Aa-4) is added to the resulting polyester polyol. This reaction can be carried out at 160 to 200° C. for 1 to 10 hours to produce the desired polyester polyol. The same catalyst as above may be added in about the same amount.

There are no particular limitations on the intrinsic viscosity of the fluorene copolymerized polyester resin (A), but it is preferably 0.3 dl/g or more, more preferably 0.35 dl/g or more, and most preferably 0.4 dl/g or more, to maintain good adhesion with the hard coat layer and other adherends. There are no specific limitations on the upper limit on the intrinsic viscosity, but it is preferably 0.8 dl/g or less to maintain high handleability. A fluorene copolymerized polyester resin (A) with a desired intrinsic viscosity can be produced by appropriately adjusting the melt polymerization conditions including polymerization time and polymerization temperature.

The fluorene copolymerized polyester resin (A) preferably has a glass transition point (hereinafter, sometimes abbreviated as Tg) of 50 to 170° C., more preferably 50 to 150° C. The adhesive property after a wet test will easily deteriorate if Tg is less than 50° C. while on the contrary, it will be sometimes impossible to form the layer C uniformly by the undermentioned in-line coating process if it is above 150° C. The methods to adjust the Tg in the range include the use of an aliphatic dicarboxylic acid component as the dicarboxylic acid component (Aa-2) that is different from the dicarboxylic acid component having a fluorene backbone that constitutes the fluorene copolymerized polyester resin (A).

The fluorene copolymerized polyester resin (A) preferably has an acid value of 20 mgKOH/g or more, more preferably 30 mgKOH/g or more. The adhesive properties, particularly the adhesive property after a wet test, can be improved if the acid value is in the range. The acid value can be maintained in the range by adjusting the amount of the higher-valent carboxylic anhydride (Aa-4) to be reacted with polyester polyol during the polymerization of the fluorene copolymerized polyester resin (A).

The fluorene copolymerized polyester resin (A) in the layer C preferably accounts for 70 wt % or more of the entire quantity of the layer C. There are no specific limitations on its upper limit, and 100 wt % is the virtual upper limit.

If the content of the fluorene copolymerized polyester resin (A) is maintained in the range, the refractive index of the layer C can be enhanced and the difference in refractive index from the base material layer, layer C, and hard coat layer will be decreased, leading to a reduced interference pattern.

The layer C preferably contain a cross linking agent (B) in addition to the fluorene copolymerized polyester resin (A) to improve the adhesive property after a heat and wet test.

When adding a cross linking agent (B) to the layer C, the sum of the content (a) of the fluorene copolymerized polyester resin (A) and the content (b) of the cross linking agent (B), i.e., (a+b), is preferably adjusted to account for 90 wt % or more of the entire quantity of the layer C. The refractive index of the layer C can be increased if the total content (a+b) is maintained in the range. There are no specific limitations on the upper limit on the total content (a+b), and 100 wt % is the virtual upper limit.

It is preferable that one or more cross linking agents selected from the group of melamine-based cross linking agent, oxazoline-based cross linking agent, and carbodiimide-based cross linking agent, is used as the cross linking agent (B) because the carboxyl group in the fluorene copolymerized polyester resin (A) is deactivated to improve the adhesive property after a heat and wet test and the self-cross-linking reaction of the cross linking agent (B) progresses to improve the adhesive property after a heat and wet test. There are no specific limitations on the content of the melamine-based, oxazoline-based, or carbodiimide-based cross linking agent (B) in the layer C, and two or more cross linking agents may be used in combination.

There are no particular limitations on the melamine-based cross linking agent, and the useful ones include melamine, a methylolated melamine derivative produced by condensation of melamine and a formaldehyde, a partly or completely etherified compound produced by reacting a methylolated melamine with a lower alcohol, and mixtures thereof. The melamine-based cross linking agent may be a monomer, a condensation product of dimmers or multimers, or a mixture thereof. The useful lower alcohols used for the etherification include methyl alcohol, ethyl alcohol, isopropyl alcohol, and n-butanol, isobutanol. The useful functional groups include the imino group, methylol group, or alkoxy methyl group such as methoxy methyl group and butoxy methyl group, and the resins comprising them in a molecule include imino group-containing methylated melamine resin, methylol group-containing melamine resin, methylol group-containing methylated melamine resin, and complete alkyl-containing methylated melamine resin, of which methylolated melamine resin is the most preferable. In addition, an acidic catalyst such as p-toluene sulfonic acid may be used to promote the heat curing of the melamine-based cross linking agent.

There are no specific limitations on the oxazoline-based cross linking agent if the oxazoline group is contained as a functional group in the compound, but it preferably comprises an oxazoline group-containing copolymer that contains at least one oxazoline group-containing monomer and is produced by copolymerization with at least one other monomer.

The useful monomers containing an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline, which may be used singly or in combination as a mixture. In particular, 2-isopropenyl-2-oxazoline is preferable in view of high industrial availability.

There are no particular limitations on the at least one other monomer used in combination with the oxazoline group-containing monomer in the oxazoline-based cross linking agent, if the monomer can copolymerize with the oxazoline group-containing monomer. The useful ones include, for instance, acrylates and methacrylates such as methyl acrylate, methyl methacrylate, ethyl acrylate, ethyl methacrylate, butyl acrylate, butyl methacrylate, 2-ethylhexyl acrylate, and 2-ethylhexyl methacrylate; unsaturated carboxylic acids such as acrylic acid, methacrylic acid, itaconate, and maleic acid; unsaturated nitriles such as acrylonitrile and methacrylonitrile; unsaturated amides such as acrylamide, methacrylamide, N-methylol acrylamide, and N-methylol methacrylamide; vinyl esters such as vinyl acetate and vinyl propionate; vinyl ethers such as methyl vinyl ether and ethyl vinyl ether; olefins such as ethylene and propylene; halogen-containing α,β-unsaturated monomers such as vinyl chloride, vinylidene chloride, and vinyl fluoride; and α,β-unsaturated aromatic monomers such as styrene and α-methyl styrene, which may be used singly or in combination as a mixture.

There are no specific limitations on the carbodiimide-based cross linking agent used if the molecule of the compound contains one or more functional groups such as a carbodiimide group and a cyanamide group that is in the tautomeric relation with the former. Specifically, the useful carbodiimide compounds include dicyclohexyl methane carbodiimide, dicyclohexyl carbodiimide, tetramethyl xylylene carbodiimide, and urea-modified carbodiimide, which may be used singly or in combination as a mixture.

It is preferable that the weight ratio of the content (a) of the fluorene copolymerized polyester resin (A) to the content (b) of the cross linking agent (B), i.e., (a)/(b), in the layer C is in the range of 70/30 or more and 95/5 or less. If the weight ratio (a)/(b) is less than 70/30, the refractive index of the layer C will not be increased sufficiently, and an interference pattern can occur when a hard coat layer with a high refractive index is formed over the surface of the layer C. On the other hand, the adhesive property after a heat and wet test for the hard coat layer will decrease, leading to inferior practical characteristics, if the weight ratio (a)/(b) is above 95/5.

In addition, the layer C of the laminated polyester film may contain various additives including, for instance, an antioxidant, thermal stabilizer, weather stabilizer, ultraviolet light absorber, organic lubricant, pigment, dye, organic or inorganic fine particles, filler, antistatic agent, and nucleus formation agent, unless they impede the effect of this disclosure.

It is more preferable that the layer C contains fine particles because the lubricity and blocking resistance can be improved.

There are no particular limitations on the fine particles to be contained. The useful ones include inorganic particles such as colloidal silica, titanium oxide, aluminum oxide, zirconium oxide, calcium carbonate, carbon black, and zeolite particles, and organic particles such as acrylic particles, silicone particles, polyimide particles, Teflon (registered trademark) particles, crosslinked polyester particles, crosslinked polystyrene particles, crosslinked polymer particles, and core-shell particles, which may be used singly or in combination as a mixture of two or more thereof.

These particles preferably have a number average primary particle diameter in the range of 0.01 to 0.4 μm. The average primary particle diameter refers to the average of the particle diameters of primary particles that have grown from single crystal nuclei and are defined as primary particles in JIS-H 7008 (2002). The particle diameter of a primary particle (hereinafter, referred to as primary particle diameter) is the average of its long axis and short axis. The average primary particle diameter is measured according to JIS-H 7804 (2005) using a scanning electronic microscope (SEM) to observe specimens at a magnification of 50,000. The long axis and short axis of each primary particle is measured from the photograph and the primary particle diameter is calculated as their average. The primary particle diameter is determined for 100 primary particles and the average primary particle diameter is calculated as their number average. The particles can coagulate and the haze of the layer C can deteriorate if the average primary particle diameter of the particles is less than 0.01 μm. If it exceeds 0.4 μm, on the other hand, the lubricity and blocking resistance will not enhance so much as expected from the quantity of the particles added and, depending on the thickness of the layer C, dropping-off of particles can take place. The average primary particle diameter of the particles is more preferably in the range of 20 to 300 nm, still more preferably 20 to 200 nm. The particles may be in the form of monodisperse particles, or agglomerated particles formed through coagulation two or more particles. It can be effective in some cases to use a combination of two or more types of particles with different average primary particle diameters. The quantity of particles to be added should be adjusted appropriately according to the thickness of the layer C, resin composition, average primary particle diameter, desired lubricity, and intended uses, but it is preferably in the range of 0.05 to 8 parts by weight, more preferably 0.1 to 5 parts by weight, relative to the entire quantity, or 100 parts by weight, of the layer C.

The surface of the layer C should have an adhesive index after a heat and wet test in the range of 3 or more and 5 or less. An antireflection film can be produced from the laminated polyester film by laminating the surface of the layer C with a high refractive index hard coat layer and a low refractive index layer. If the adhesive index after a heat and wet test is 3 or more, it is possible to prevent the deterioration in the adhesion between the laminated polyester film and the hard coat layer under high temperature and high humidity conditions, allowing the film to be used preferably in uses that require a high adhesive property after a wet test. The adhesive index after a heat and wet test should be 3 or more and its upper limit is 5. The measuring method for the adhesive index after a heat and wet test is described in detail below.

A method to achieve an adhesive index after a heat and wet test in the range is the use of a fluorene copolymerized polyester resin (A) that either contains no dicarboxylic acid component (Aa-3) comprising a sulfonate group or contains it up to less than 0.1 mol % relative to the quantity of the dicarboxylic acid component (Aa) that constitutes the fluorene copolymerized polyester resin (A). The adhesive index after a heat and wet test can be further improved by adding the cross linking agents to the layer C.

The laminated polyester film preferably has a spectral reflectivity at a wavelength of 550 nm of 6.0 to 8.3% to reduce the interference pattern on the hard coat layer. It is more preferably 6.5 to 8.3%, most preferably 6.5 to 8.0%. A spectral reflectivity outside the range is not preferable because an interference-based cancel effect will not occur significantly, leading to an interference pattern on the hard coat layer. A spectral reflectivity in the range can be achieved by adjusting the copolymerization degree of the dicarboxylic acid component (Aa-1) having a fluorene backbone and the glycol component (Ab-1) having a fluorene backbone in the fluorene copolymerized polyester resin (A).

The layer thickness of the layer C is preferably in the range of 2 to 200 nm, more preferably 2 to 100 nm, still more preferably 2 to 20 nm, to reduce the interference pattern on the hard coat layer. For the layer C, an excessively large thickness is not preferable because the interference-based cancel effect of the optical path difference will not occur significantly, leading to an interference pattern when a hard coat layer is formed. An excessively small thickness is not preferable either because adhesion with the hard coat layer can deteriorate.

The methods to produce a laminated film consisting of the layer S and the layer C include laminating the layer S with the layer C. In particular, a preferable method is coating the layer S with a coating material that will form the layer C. The useful coating methods include a so-called off-line coating method in which the coating is performed in a separate step from the step to produce the layer S, and a so-called in-line coating method in which coating is performed during the layer S production step so that a laminated polyester film consisting of the layer S laminated with the layer C is produced in one step. However, it is preferable to adopt an in-line coating method in view of required cost and uniformity of the coating thickness, and in such cases, it is most preferable to use a water-soluble solvent as coating liquid in view of environment contamination and explosion proof performance.

Useful methods for coating an aqueous coating agent include, but not limited to, reverse coating, spray coating, bar coating, gravure coating, rod coating, and die coating.

The surface of the layer S, which works as base layer, is subjected to corona discharge treatment before the coating with an aqueous coating agent to adjust the surface wetting tension on the surface to preferably 47 mN/m or more, more preferably 50 mN/m or more. This serves to improve the adhesion between the layer C and the layer S, and enhance the coating performance.

Our films and methods will now be illustrated in greater detail with reference to a case where a polyethylene terephthalate (hereinafter, abbreviated as PET) film is used, but it should be understood that this disclosure is not construed as being limited thereto.

PET pellets with an intrinsic viscosity of 0.5 to 0.8 dl/g to constitute the layer S was vacuum-dried, supplied to an extruder, melted at 260 to 300° C., extruded through a T-form orifice to form a sheet, and wound up on a mirror finished casting drum with a surface temperature of 10 to 60° C. by the static electricity-applying casting technique to cool and solidify the sheet, thereby providing an unstretched PET film. This unstretched film was stretched 2.5 to 5 times in the vertical direction (traveling direction of the film, or length direction) between rolls heated at 70 to 100° C. At least one side of this film is subjected to corona discharge treatment in air to cause the surface to have a wetting tension of 47 mN/m or more, and the processed surface is coated with an aqueous coating agent composed primarily of a cross linking agent (B) and the fluorene copolymerized polyester resin (A) to constitute the layer C (as dicarboxylic acid component (Aa), preferably not containing a dicarboxylic acid component (Aa-3) with a sulfonate group). This coated laminated film is held with a clip, sent to a drying zone, dried at a temperature below the Tg of the polyester resin that constitutes the layer S, further heated up to a temperature above the Tg, dried again at a temperature near the Tg, stretched further 2.5 to 5 times in a heating zone at 70 to 150° C. in the horizontal direction (perpendicular to the travelling direction of the film, or width direction), and heat-treated in a heating zone at 200 to 240° C. for 5 to 40 seconds to provide a polyester film consisting of the fully crystal-oriented layer S laminated with the layer C formed. Relaxation of 3 to 12% may be performer as needed during the heat treatment. Biaxial stretching may be carried out by sequential longitudinal-horizontal stretching or simultaneous biaxial stretching. Furthermore, longitudinal stretching may be carried out first followed by horizontal re-stretching, and vice versa. There are no specific limitations on the thickness of the laminated polyester film, but it is preferably 3 to 300 μm. The coating material used here is preferably an aqueous coating agent in view of environment contamination and explosion proof performance.

In a laminated polyester film obtained as described above, the surface of the layer C has good adhesive property to the hard coat layer formed of active line-cured resin, and the layer C contains the fluorene copolymerized polyester resin (A) with a high refractive index. This serves to reduce the difference in refractive index from the high refractive index hard coat layer formed over the surface of the layer C, leading to a film with a largely reduced interference pattern. In the case where a dicarboxylic acid component (Aa-3) having a sulfonate group is not contained as hydrophilic component, the deterioration in the adhesive property to the hard coat layer under high temperature and high humidity conditions can be reduced down to the limit. Furthermore, addition of the cross linking agent (B) further improves the spreadability, leading not only less uneven coating over the coated film (layer C), but also improved adhesive property to the hard coat layer. Such a laminated polyester film can be used as material for hard coating film, antireflection film produced by adding a low refractive index layer, laminated film for touch panels provided with a conductive metal oxide layer, and laminated film for display devices such as laminated film for electronic paper.

Described below is an optical-use laminated film consisting of the laminated polyester film provided with a hard coat layer.

There are no specific limitations on the material that constitutes the hard coat layer if it transmits visible light, and it preferably has high light transmission. The useful materials include acrylic resin, polycarbonate resin, vinyl chloride resin, polyester resin, urethane resin, and active line-cured resin. In particular, acrylic resin, urethane resin, and active line-cured resin are preferable in view of abrasion resistance and productivity.

For the active line-curable resin used as a component of the hard coat layer, the useful monomer components to constitute the active line-curable resin include, for instance, polyfunctional (meth)acrylic compounds such as pentaerythritol tri (meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane tri (meth)acrylate, bis(methacroyl thiophenyl)sulfide, 2,4-dibromophenyl(meth)acrylate, 2,3,5-tribromophenyl(meth) acrylate, 2,2-bis(4-(meth)acryloyl-oxy phenyl)propane, 2,2-bis(4-(meth)acryloyl-oxy ethoxy phenyl)propane, 2,2-bis(4-(meth)acryloyl-oxy diethoxy phenyl)propane, 2,2-bis(4-(meth)acryloyl pentaethoxy phenyl)propane, 2,2-bis(4-(meth)acryloyl-oxy ethoxy-3,5-dibromophenyl)propane, 2,2-bis(4-(meth)acryloyl-oxy diethoxy-3,5-dibromophenyl) propane, 2,2-bis(4-(meth)acryloyl-oxy pentaethoxy-3,5-dibromophenyl)propane, 2,2-bis(4-(meth)acryloyl-oxy ethoxy-3,5-dimethyl phenyl)propane, 2,2-bis(4-(meth)acryloyl-oxy ethoxy-3-phenyl phenyl)propane, bis(4-(meth)acryloyl-oxy phenyl)sulfone, bis(4-(meth)acryloyl-oxy ethoxy phenyl)sulfone, bis(4-(meth)acryloyl-oxy pentaethoxy phenyl)sulfone, bis(4-(meth)acryloyl-oxy ethoxy-3-phenyl phenyl)sulfone, bis(4-(meth)acryloyl-oxy ethoxy-3,5-dimethyl phenyl)sulfone, bis(4-(meth)acryloyl-oxy phenyl)sulfide, bis (4-(meth)acryloyl-oxy ethoxy phenyl)sulfide, bis(4-(meth) acryloyl-oxy pentaethoxy phenyl)sulfide, bis(4-(meth)acryloyl-oxy ethoxy-3-phenyl phenyl)sulfide, bis(4-(meth) acryloyl-oxy ethoxy-3,5-dimethyl phenyl)sulfide, di((meth) acryloyl-oxy ethoxy)phosphate, and (meth)acryloyl-oxy ethoxy)phosphate, which may be singly or in combination of two or more thereof.

Along with these polyfunctional (meth)acrylic compounds, others including styrene, chlorostyrene, dichlorostyrene, bromostyrene, dibromostyrene, divinylbenzene, vinyl toluene, 1-vinyl naphthalene, 2-vinyl naphthalene, N-vinyl pyrolidone, phenyl(meth)acrylate, benzyl(meth)acrylate, biphenyl(meth)acrylate, diallyl phthalate, dimethallyl phthalate, diallyl biphenylate, and reaction products of (meth) acrylic acid with metals such as barium, lead, antimony, titanium, tin, and zinc may be used to enhance the hardness, transparency, strength, and refractive index of the active line-cured resin. They may be used singly or as a mixture of two or more thereof.

The expression "(meth)acrylic compounds" refers to both methacrylic compounds and acrylic compounds, and similar expressions are used for other compounds.

Irradiation with ultraviolet light, for instance, can be performed as a method to cure an active line-curable resin. In this case, a photopolymerization initiator is preferably added to the compounds up to about 0.01 to 10 parts by weight.

The active line-curable resin may contain organic solvents including isopropyl alcohol, ethyl acetate, and methyl ethyl ketone for improving coating workability and coating film thickness control unless they impair the effect of this disclosure.

An active line refers to electromagnetic radiation that can polymerize acrylic vinyl groups such as ultraviolet light, electronic line, and radioactive rays (such as α ray, β ray, and γ ray), and the use of ultraviolet light is easy and practically preferred. The useful ultraviolet light sources include ultraviolet fluorescent lamp, low pressure mercury lamp, high pressure mercury lamp, ultrahigh pressure mercury lamp, xenon lamp, and carbon arc lamp. The use of electron beam is advantageous because addition of a photopolymerization initiator, photosensitization agent or the like is not necessary although it needs expensive equipment and operations in an inactive gas.

With respect to the hard coat layer, the refractive index of the hard coat layer can be enhanced by adding, for instance, fine particles of a metal oxide. Such metal oxides for the fine particles include, for instance, titanium oxide, zirconium oxide, zinc oxide, oxidized tin, oxidized antimony, cerium dioxide, iron oxide, antimony acid zinc, tin oxide doped indium oxide (ITO), antimony doped tin oxide (ATO), aluminum doped zinc oxide, gallium doped zinc oxide, and fluorine doped tin oxide. These may be used singly or in combination of two or more thereof.

The content of the fine metal oxide particles in the high refractive index hard coat layer is preferably in the range of 20 to 90 parts by weight, more preferably 30 to 80 parts by weight, relative to 100 parts by weight of the resin component of the (meth)acrylic compounds.

There are no specific limitations on the thickness of the hard coat layer, and it is designed appropriately depending on the refractive index of the layer C and hard coat layer, and intended uses, but it is commonly 1 to 10 μm, preferably 2 to 5 μm. If the thickness of the hard coat layer is in this preferable range, sufficiently high hard coating performance is achieved and curling of the film is not caused from the shrinkage that can occur during the curing of the hard coat layer.

It is preferable to provide the surface of the hard coat layer with a reflection prevention layer, or perform antifouling processing for dirt prevention.

In particular, it is particularly preferable that the surface of the high refractive index hard coat layer in an optical-use laminated film is laminated with a low refractive index layer that serves as reflection prevention layer, thereby providing an antireflection film.

There are no specific limitations on the reflection prevention layer, it can be formed by lamination with a low refractive index compound, or sputtering or deposition of an inorganic compound such as magnesium fluoride and silicon oxide. With respect to antifouling processing, silicone resin, fluorine resin and the like can serve for antifouling processing.

It is particularly preferable that the refractive index of the high refractive index hard coat layer is 1.63 to 1.75 while the refractive index of the low refractive index layer is 1.40 or less to improve the reflection prevention performance.

As described above, the low refractive index layer of the high refractive index hard coat layer preferably has a refractive index of 1.40 or less, and the lower limit to the refractive index of the low refractive index layer is 1.30. The refractive index of the low refractive index layer is more preferably 1.35 to 1.40. To improve the reflection prevention performance, the low refractive index layer preferably has a thickness in the range of 70 to 160 nm, more preferably 80 to 140 nm, still more preferably 85 to 105 nm.

Described below is the method to measure the refractive index of the high refractive index hard coat layer and the low refractive index layer.

First, a coating material that forms the high refractive index hard coat layer or low refractive index layer is spread over a Test Piece D for film measurement (supplied by Atago Co., Ltd.) up to a coated film thickness of about 3 μm.

Then, using a light-gathering high pressure mercury lamp (H03-L31, supplied by Eye Graphics Co., Ltd.), the coated film irradiated ultraviolet light up to an integrated irradiation intensity of 400 mJ/cm$^2$ to cure the coated film. An industrial UV checker (UVR-N1, supplied by Japan Storage Battery Co., Ltd.) is used to measure the integrated irradiation intensity of the ultraviolet light.

The refractive index of the cured coated film at 23° C. and relative humidity 65% was measured with an Abbe refractometer (NAR-1T, supplied by Atago Co., Ltd.).

Then, the low refractive index layer is described more specifically.

The low refractive index layer is preferably produced by curing a composition consisting of fine silica particles or a fluorine-containing compound, and an active line-curable resin. The fine silica particles and a fluorine-containing compound may be used singly or in combination.

With respect to the fine silica particles, it is preferable to use fine silica particles because they serve to decrease the refractive index of the low refractive index layer.

The hollow fine silica particles may be in the form of fine silica particles each having a void inside or in the form of porous fine silica particles each having many voids inside, both being preferable. Such hollow fine silica particles can be produced according to the method disclosed in Japanese Patent No. 3272111, or commercially available products can also be used.

The content of the fine silica particles is preferably in the range of 20 to 90 mass % relative to the total quantity, or 100 mass %, of the low refractive index layer.

The fluorine-containing compound may be a fluorine-containing monomer or a fluorine-containing polymer compound.

The useful fluorine-containing monomers include, for instance, fluorine-containing (meth)acrylates such as 2,2,2-trifluoroethyl(meth)acrylate, 2,2,3,3,3-penta fluoropropyl (meth)acrylate, 2-(perfluorobutyl)ethyl (meth)acrylate, 2-(perfluorohexyl)ethyl(meth)acrylate, 2-(perfluorooctyl) ethyl(meth)acrylate, and 2-(perfluorodecyl)ethyl(meth)acrylate.

The fluorine-containing polymer compound may be, for instance, a fluorine-containing copolymer composed of, as constituent units, a fluorine-containing monomer and another monomer that can form a cross linking group. Specifically, the useful fluorine-containing monomer units include, for instance, fluoroolefins such as fluoroethylene, vinylidene fluoride, tetrafluoroethylene, hexafluoroethylene, hexafluoropropylene, and perfluoro-2,2-dimethyl-1,3-dioxole; and partly or entirely fluorinated alkyl ester derivatives of (meth) acrylic acids such as Biscoat 6FM (supplied by Osaka Organic Chemical Industry Ltd.), M-2020 (supplied by Daikin Chemical Industry Co., Ltd), and entirely or partially fluorinated ether. The useful monomers to form a cross linking group include a (meth)acrylate monomer that contains a cross linking functional group in its molecule, such as glycidyl methacrylate; and a (meth)acrylate monomer that contains a carboxyl group, hydroxyl group, amino group, or sulfonic group, such as (meth)acrylic acid, methylol(meth) acrylate, hydroxyalkyl(meth)acrylate, and allyl acrylate.

The content of the fluorine-containing compound is preferably in the range of 5 to 90 wt % relative to the total quantity, or 100 wt %, of the low refractive index layer.

The active line-cured resin may be the same as the active line-cured resin used as a component of the hard coat layer.

The content of the active line-cured resin is preferably in the range of 20 to 90 wt % relative to the total quantity, or 100 wt %, of the low refractive index layer.

The method to be used to cure the active line-curable resin may also be the same as the method used to cure the active line-curable resin in the hard coat layer.

Measuring Method for Characteristics and Evaluation Method for Their Effect

The measuring method for characteristics and the evaluation method for their effect are described below.

(1) Layer Thickness of the Layer C

An ultrathin cross section was cut out of the laminated film and observed by TEM (transmission electron microscopy) according to the stained ultrathin section method using $RuO_4$ staining, $OsO_4$ staining, or both for double staining under the following conditions where visual observation of the cross-sectional structure can be performed. The thickness of the layer C was determined from photographs of the cross section.

Measuring equipment: transmission electron microscope (H-7100FA, supplied by Hitachi, Ltd.)
Measuring conditions: accelerating voltage 100 kV
Specimen preparation: ultrathin freeze-sectioning
Magnification: ×300,000.

(2) Spectral Reflectivity

For measurement of the spectral reflectivity, a black gloss tape with a 50 mm width (No. 200-50-21 (Black) plastic tape, supplied by Yamato Co., Ltd.) was applied to the uncoated surface of the layer C (opposite to the measuring surface in the case of a double coated tape), with care to eliminate bubbles, and a test specimen of about 4 cm square was cut out. An integrated sphere with a 60 diameter (Model 130-0632, supplied by Hitachi, Ltd.) and a 10° inclined spacer were fixed on a spectrophotometer (Model U3410, supplied by Hitachi, Ltd.), and the spectral reflectivity was measured at an incidence angle of 10°. An accessory $Al_2O_3$ plate was used as standard reflection plate to normalize the reflectance measurements.

(3) Interference Pattern

An active line-curable resin (XJC-0357-1, supplied from Pelnox, Ltd., refractive index 1.67) to form the hard coat layer was spread uniformly with a bar coater over the laminated polyester film so that the film thickness will be 1.5 μm after being cured.

Then, the specimen was irradiated with ultraviolet light from a light-gathering high pressure mercury lamp (H03-L31, supplied by Eye Graphics Co., Ltd.) with an irradiation intensity of 120 W/cm, installed at a 9 cm height above the surface of the layer C, so that the integrated irradiation intensity would be 300 mJ/cm². It was then cured to form an optical-use laminated film consisting of a laminated film with a hard coat layer formed over its surface. An industrial UV checker (UVR-N1, supplied by Japan Storage Battery Co., Ltd.) was used to measure the integrated irradiation intensity of the ultraviolet light. The hard coat layer had a refractive index of 1.67.

Subsequently, a specimen of 8 cm (in the width direction of the laminated polyester film)×10 cm (in the length direction of the laminated polyester film) was cut out from the resulting optical-use laminated film, and a black gloss tape (No. 200-50-21 (Black) plastic tape, supplied by Yamato Co., Ltd.) was applied to the surface opposite to the hard coat layer side, with care to eliminate bubbles.

In a darkroom, this specimen was placed 30 cm immediately below a three-wave type fluorescent lamp (3-wavelength daylight (F•L 15EX-N 15 W), supplied by Matsushita Electric Industrial Co., Ltd.), and visually observed from various angles to measure the degree of the interference pattern, followed by making the following evaluations. The specimen was given "B" if it had quality of a practical use level, and "A" or "S" if it had good quality.

S: virtually free of interference pattern
A: interference pattern is slightly visible
B: weak interference pattern visible
C: strong interference pattern visible (4) Initial Adhesive Property An optical-use laminated film was produced with the same method as in Paragraph (3).

Then, 100 crosscuts of 1 mm² were made in the hard coat layer of an optical laminated film. This was carried out by the procedure specified in Clause 7 of JIS-K 5600-5-6 (1999) except for the following points:

Test conditions and number of test runs: Despite the provisions in Item 7.1.1 of JIS-K 5600-5-6 (1999), the test was carried out under the conditions of 23° C. and relative humidity 65%. One test run was performed.
Curing of test plate: Despite the provisions in Item 7.1.2 of JIS-K 5600-5-6 (1999), the test was carried out under the conditions of 23° C. and relative humidity 65%. Curing was performed for one hour.
Number of cuts: Despite the provisions in Item 7.1.3 of JIS-K 5600-5-6 (1999), 11 cuts were made.
Intervals of cuts: Despite the provisions in Item 7.1.4 of JIS-K 5600-5-6 (1999), the cuts were made at intervals of 1 mm.
Cutting and removal of coated film by manual procedure: The provisions in Item 7.2.5 of JIS-K 5600-5-6 (1999) are not applied. Specifically, brushing with a brush is not performed. With respect to Item 7.2.6 of JIS-K 5600-5-6 (1999), only the provision of the second paragraph ("Place the tape on the grid, with its center parallel to the corner cut, as shown in FIG. 3, and flatten it with a finger in the portion overlapping the grid, plus a portion with a length of at least 20 mm") was applied, and the other provisions are not applied. The tape should be a cellophane tape (Cellotape (registered trademark) CT405AP, supplied by Nichiban Co., Ltd.).

Application of the tape was performed using a hand roller (HP515, supplied by Audio-Technica Corporation), which was pressed against the surface with a load of 19.6 N/m and moved to-and-fro three times at a roller travelling speed of 5 cm/sec. Subsequently, the tape was peeled at a speed of 10 cm/sec in the 90 degree direction to the hard coat layer surface, and four level evaluation was implemented in terms of the number of squares left on the hard coat layer. The specimen was given "S" or "A" if it had good adhesive property.

S: 100/100 (number of squares left/original number for measurement)
A: 90/100 or more, less than 100/100
B: 80/100 or more, less than 90/100
C: less than 80/100

(5) Adhesive Index after a Heat and Wet Test

An optical-use laminated film was produced with the same method as in Paragraph (3). The resulting optical-use laminated film was left to stand for 250 hours in a constant temperature and humidity tank at a temperature of 70° C. and relative humidity of 90% to prepare a specimen for adhesive test after a heat and wet test. For the resulting specimen for adhesive test after a heat and wet test, an adhesive property test was carried out according to the same method as described in Paragraph (4), and five level evaluation was implemented in terms of the number of squares left to determine the adhesive index after a heat and wet test. The specimen was given "4" or "5" if it had good adhesive property after a heat and wet test, "3" if practical, and "2" or "1" if poor in adhesive property after a heat and wet test.
- 5: 100/100 (number of squares left/original number for measurement)
- 4: 90/100 or more, less than 100/100
- 3: 80/100 or more, less than 90/100
- 2: 50/100 or more, less than 80/100
- 1: less than 50/100

(6) Interference Pattern in Antireflection Film

Evaluation of the interference pattern in the antireflection film was observed visually according to the same method as described in Paragraph (3). The degree of the interference pattern measured, and evaluated as follows. The specimen was given "B" if it had quality of a practical use level, and "A" or "S" if it had good quality.
- S: virtually free of interference pattern
- A: interference pattern is slightly visible
- B: weak interference pattern visible
- C: strong interference pattern visible (7) Initial Adhesive Property of Antireflection Film For the antireflection film, an adhesive property test was carried out according to the same method as described in Paragraph (4), and four level evaluation was implemented in terms of the number of squares left to determine the initial adhesive property of the antireflection film. The specimen was given "S" or "A" if it had good adhesive property.
- S: 100/100 (number of squares left/original number for measurement)
- A: 90/100 or more, less than 100/100
- B: 80/100 or more, less than 90/100
- C: less than 80/100

EXAMPLES

Our films and methods will now be illustrated in greater detail with reference to Examples and Comparative Examples, but it should be understood that this disclosure is not construed as being limited thereto. Processes for preparation of the resins and the like used in Examples and Comparative Examples are described first as Reference Examples.

Reference Example 1

Preparation of Fluorene Copolymerized Polyester Resin (A-1)

In a nitrogen gas atmosphere, 75 parts by mole of dimethyl succinate, used as the dicarboxylic acid component (Aa-2) free of a fluorene backbone, 80 parts by mole of 9,9-bis[4-(2-hydroxy ethoxy)phenyl]fluorene, used as the glycol component (Ab-1) having a fluorene backbone, and 20 parts by mole of ethylene glycol, used as the glycol component (Ab-2) free of a fluorene backbone, were fed to an ester interchange reaction vessel. Then, tetrabutyl titanate (catalyst) is added to this up to 100 parts by weight relative to 1,000,000 parts by weight of the dicarboxylate derivative (dimethyl succinate), and esterification reaction was carried out at 160 to 200° C. for 5 hours, followed by distilling out methanol. The reaction was further continued for 30 minutes at 240° C. under a reduced pressure of 0.2 MPa, thereby producing a polyester polyol.

Subsequently, 25 parts by mole of 1,2,4,5-benzene tetracarboxylic dianhydride, used as the trivalent or higher-valent carboxylic acid component (Aa-4), is added to the polyester polyol, and reacted at a reaction temperature of 160 to 180° C. for 3 hours, thereby producing a fluorene copolymerized polyester resin (A-1). The polyester resin had a Tg of 99° C. The copolymerized quantity of the glycol component (Ab-1) having a fluorene backbone in the fluorene copolymerized polyester resin (A-1) accounts for 40 mol % relative to the total quantity (100 mol %) of the dicarboxylic acid component (Aa) and the glycol component (Ab). The fluorene copolymerized polyester resin (A-1) is a polyester resin free of the dicarboxylic acid component (Aa-3) with a sulfonate group.

Reference Example 2

Preparation of a Water Dispersion (A-1aq) of the Fluorene Copolymerized Polyester Resin (A-1)

Next, 531.6 parts by weight (hereinafter, simply referred to as "parts") of water, 2.0 parts of 25 wt % aqueous ammonia, and 33.4 parts of butyl cellosolve were added to 100.0 parts of the fluorene copolymerized polyester resin (A-1), and dissolved at 40° C. Subsequently, this reaction container was closed airtightly, and heated so that the internal temperature of the container reached 120° C., and reaction was performed for 2 hours to produce a water dispersion (A-1aq) of the fluorene copolymerized polyester resin. The composition of the water dispersion (A-1aq) of the fluorene copolymerized polyester resin was as follows:
- fluorene copolymerized polyester resin (A-1): 100 parts (14.993 wt %)
- water: 533.1 parts (79.925 wt %)
- ammonia: 0.5 parts (0.075 wt %)
- butyl cellosolve: 33.4 parts (5.007 wt %).

Reference Example 3

Preparation of Water Dispersion (B-1aq) of Methylol Group-Containing Melamine Cross Linking Agent A water dispersion (Nikalac MW12LF, supplied by Sanwa Chemical Co., Ltd.) containing 78.8 wt % of a methylol group-containing melamine cross linking agent (B-1) was diluted with water for adjustment to the following composition, thereby producing a water dispersion (B-1aq) of the methylol group-containing melamine cross linking agent:
- methylol group-containing melamine cross linking agent (B-1): 25 wt %
- water: 75 wt %.

Reference Example 4

Preparation of Water Dispersion (B-2aq) of Oxazoline-Based Cross Linking Agent

A water dispersion (Epocros WS300, supplied by Nippon Shokubai Co., Ltd.) containing 10 wt % of an oxazoline-based cross linking agent (B-2) was used.

Reference Example 5

Preparation of Water Dispersion (B-3aq) of Carbodiimide-Based Cross Linking Agent A water dispersion (Carbodilite V04, supplied by Nisshinbo Industries, Inc.) containing 40 wt % of a carbodiimide-based cross linking agent (B-3) was diluted with water for adjustment to the following composition, thereby producing a water dispersion (B-3aq) of the carbodiimide-based cross linking agent:
carbodiimide-based cross linking agent (B-3): 10 wt %
water: 90 wt %.

Reference Example 6

Preparation of Water Dispersion (C-1aq) of Colloidal Silica

A water dispersion (Cataloid SI80P, supplied by Catalysts & Chemicals Industries Co. Ltd.) containing 40 wt % of colloidal silica was diluted with water for adjustment to the following composition, thereby producing a water dispersion (C-1aq) of the colloidal silica:
colloidal silica: 5 wt %
water: 95 wt %.

Reference Example 7

Preparation of Water Dispersion (C-2aq) of Colloidal Silica

A water dispersion (Snowtex OL, supplied by Nissan Chemical Industries, Ltd.) containing 20 wt % of colloidal silica was diluted with water for adjustment to the following composition, thereby producing a water dispersion (C-2aq) of the colloidal silica:
colloidal silica: 5 wt %
water: 95 wt %.

Reference Example 8

Preparation of Water Dispersion (D-1aq) of Surface Active Agent

A water dispersion (Olfin EXP4051F, supplied by Nissin Chemical Industry Co., Ltd.) containing 50 wt % an acetylene diol-based surface active agent was diluted with water for adjustment to the following composition, thereby producing a water dispersion (D-1aq) of the surface active agent water dispersion:
surface active agent: 5 wt %
water: 95 wt %.

Reference Example 9

Preparation of Polyester Resin (P-1)

In a nitrogen gas atmosphere, 60 parts by mole of terephthalic acid, 15 parts by mole of isophthalic acid and 5 parts by mole of sebacic acid, used as the dicarboxylic acid component (Aa-2) free of a fluorene backbone, and 40 parts by mole of diethylene glycol, 35 parts by mole of 1,4-butanediol, and 25 parts by mole of ethylene glycol, used as the glycol component (Ab-2) free of a fluorene backbone, were fed to an ester interchange reaction vessel. Then, tetrabutyl titanate (catalyst) was added to this up to 100 parts by weight relative to 1,000,000 parts by weight (total quantity) of the dicarboxylic acid component, and esterification reaction was carried out at 160 to 240° C. for 5 hours, followed by removal of the distillate.

Afterwards, 20 parts by mole of trimellitic acid, used as the trivalent or higher-valent carboxylic acid component (Aa-4), and tetrabutyl titanate were further add up to 100 parts by weight relative to 1,000,000 parts by weight (total quantity) of dicarboxylic acid. After removing the distillate at 240° C. to make the reactant transparent, condensation polymerization reaction was carried out at 220 to 280° C. under reduced pressure to produce a polyester resin (P-1 ). The polyester resin had a Tg of 20° C.

The polyester resin (P-1) is a polyester resin that is not copolymerized with a component having a fluorene backbone. The polyester resin (P-1) is also a polyester resin that does not contain the dicarboxylic acid component (Aa-3) with a sulfonate group.

Reference Example 10

Preparation of Water Dispersion (P-1aq) of Polyester Resin (P-1)

Water was dispersed by the same procedure as for the fluorene copolymerized polyester resin (A-1) to produce a water dispersion (P-1aq) of a polyester resin.

The water dispersion (P-1aq) of a polyester resin had a composition as follows:
polyester resin (P-1): 100 parts (25.000 wt %)
water: 299.9 parts by weight (74.975 wt %)
ammonia: 0.1 parts by weight (0.025 wt %).

Reference Example 11

Preparation of Polyester Resin (P-2)

In a nitrogen gas atmosphere, 88 parts by mole of 2,6-naphthalene dicarboxylic acid, used as the dicarboxylic acid component (Aa-2) free of a fluorene backbone, and 90 parts by mole of ethylene glycol, and 10 parts by mole of diethylene glycol, used as the glycol component (Ab-2) free of a fluorene backbone, were fed to an ester interchange reaction vessel. Then, tetrabutyl titanate (catalyst) is added to this up to 100 parts by weight relative to 1,000,000 parts by weight (total quantity) of the dicarboxylic acid component, and esterification reaction was carried out at 160 to 240° C. for 5 hours, followed by removal of the distillate.

Afterwards, 12 parts by mole of 5-sodium sulfodimethyl isophthalate, used as the dicarboxylic acid component (Aa-3) with a sulfonate group, and tetrabutyl titanate were add up to 100 parts by weight relative to 1,000,000 parts by weight (total quantity) of dicarboxylic acid. After removing the distillate at 240° C. to make the reactant transparent, condensation polymerization reaction was carried out at 220 to 280° C. under reduced pressure to produce a polyester resin (P-2). The polyester resin had a Tg of 100° C. The polyester resin (P-2) is a polyester resin that is not copolymerized with a component having a fluorene backbone. The copolymerized quantity of the dicarboxylic acid component (Aa-3) having a sulfonate group is 12 mol % relative to the dicarboxylic acid component (Aa).

Reference Example 12

Preparation of Water Dispersion (P-2aq) of Polyester Resin (P-2)

First, 200 parts of polyester resin (P-2) and 150 parts of tetratetrahydrofuran were dissolved at 80° C., and 500 parts of water of 80° C. was added to produce a water/tetratetrahydrofuran solution of the polyester resin (P-2). Then, tetratetrahydrofuran in the resulting solution was distilled out, and after cooling, water was added to produce a water dispersion (P-2aq) of the polyester resin.

The water dispersion (P-2aq) of the polyester resin had a composition as follows:
 polyester resin (P-2): 100 parts (25 wt %)
 water: 300 parts (75 wt %).

Reference Example 13

Preparation of Polyester Resin (P-3)

According to the undermentioned copolymerization composition, ester interchange reaction and condensation polymerization were carried out by the same procedure as for the polyester resin (P-2) to produce a polyester resin (P-3). The polyester resin had a Tg of 100° C. The polyester resin (P-3) was a polyester resin that was copolymerized with a component having a fluorene backbone. The copolymerized quantity of the dicarboxylic acid component (Aa-3) having a sulfonate group is 1 mol % relative to the dicarboxylic acid component (Aa).
 99 parts by mole of 2,6-naphthalene dicarboxylic acid as the dicarboxylic acid component (Aa-2) free of a fluorene backbone
 90 parts by mole of ethylene glycol and 10 parts by mole of diethylene glycol as the glycol component (Ab-2) free of a fluorene backbone
 1 part by mole of 5-sodiumsulfodimethyl isophthalate as the dicarboxylic acid component (Aa-3) having a sulfonate group Reference Example 14

Preparation of Water Dispersion (P-3aq) of Polyester Resin (P-3)

First, 200 parts of polyester resin (P-3) and 150 parts of tetratetrahydrofuran were dissolved at 80° C., and 500 parts of water of 80° C. was added to produce a water/tetratetrahydrofuran solution of the polyester resin (P-3). Then, 50 parts of butyl cellosolve was added to the water/tetratetrahydrofuran solution. Tetratetrahydrofuran in the resulting solution was distilled out, and after cooling, water was added to produce a water dispersion (P-3aq) of the polyester resin.

The water dispersion (P-3aq) of the polyester resin had a composition as follows:
 polyester resin (P-3): 100 parts (10 wt %)
 water: 850 parts by weight (85 wt %)
 butyl cellosolve: 50 parts by weight (5 wt %).

Reference Example 15

Preparation of Fluorene Copolymerized Polyester Resin (A-2)

According to the undermentioned copolymerization composition, ester interchange reaction and condensation polymerization were carried out by the same procedure as for the polyester resin (P-2) to produce a fluorene copolymerized polyester resin (A-2). The polyester resin had a Tg of 130° C. The copolymerized quantity of the glycol component (Ab-1) having a fluorene backbone in the fluorene copolymerized polyester resin (A-2) is 40 mol % relative to the total quantity (100 mol %) of the dicarboxylic acid component (Aa) and the glycol component (Ab). The copolymerized quantity of the dicarboxylic acid component (Aa-3) having a sulfonate group is 5 mol % relative to the dicarboxylic acid component (Aa).
 90 parts by mole of 2,6-dimethyl naphthalene dicarboxylate and 5 parts by mole of dimethyl isophthalate as the dicarboxylic acid component (Aa-2) free of a fluorene backbone
 80 parts by mole of 9,9-bis[4-(2-hydroxy ethoxy)phenyl] fluorene as the glycol component (Ab-1) having a fluorene backbone
 10 parts by mole of ethylene glycol and 10 parts by mole of diethylene glycol as the glycol component (Ab-2) free of a fluorene backbone
 5 parts by mole of 5-sodiumsulfodimethyl isophthalate as the dicarboxylic acid component (Aa-3) having a sulfonate group Reference Example 16

Preparation of Water Dispersion (A-2aq) of Fluorene Copolymerized Polyester Resin (A-2)

First, 20 parts of the fluorene copolymerized polyester resin (A-2) and 80 parts of tetratetrahydrofuran were dissolved at 80° C., and 500 parts of water of 80° C. was added to produce a water/tetratetrahydrofuran solution of the polyester resin (A-2). Then, 50 parts of butyl cellosolve was added to the water/tetratetrahydrofuran solution. Tetratetrahydrofuran in the resulting solution was distilled out, and after cooling, water was added to produce a water dispersion (A-2aq) of the polyester resin (A-2).

The water dispersion (A-2aq) of the polyester resin had a composition as follows:
 fluorene copolymerized polyester resin (A-2): 100 parts (10 wt %)
 water: 850 parts by weight (85 wt %)
 butyl cellosolve: 50 parts by weight (5 wt %).

Reference Example 17

Preparation of Fluorene Copolymerized Polyester Resin (A-3)

According to the undermentioned copolymerization composition, ester interchange reaction and condensation polymerization were carried out by the same procedure as for the polyester resin (A-1) to produce a polyester resin (A-3). The polyester resin had a Tg of 95° C. The copolymerized quantity of the glycol component (Ab-1) having a fluorene backbone in the fluorene copolymerized polyester resin (A-3) is 40 mol % relative to the total quantity (100 mol %) of the dicarboxylic acid component (Aa) and the glycol component (Ab). The fluorene copolymerized polyester resin (A-3) is a polyester resin that does not contain the dicarboxylic acid component (Aa-3) having a sulfonate group.
 93 parts by mole of dimethyl succinate as the dicarboxylic acid component (Aa-2) free of a fluorene backbone
 80 parts by mole of 9,9-bis[4-(2-hydroxy ethoxy)phenyl] fluorene as the glycol component (Ab-1) having a fluorene backbone
 20 parts by mole of ethylene glycol as the glycol component (Ab-2) free of a fluorene backbone 7 parts by mole of 1,2,4,5-benzene tetracarboxylic dianhydride as the trivalent or higher-valent carboxylic acid component (Aa-4)

Reference Example 18

Preparation of Water Dispersion (A-3aq) of Fluorene Copolymerized Polyester Resin (A-3)

Water was dispersed by the same procedure as for the fluorene copolymerized polyester resin (A-1) to produce a water dispersion (A-3aq) of a fluorene copolymerized polyester resin.

The water dispersion (A-3aq) of a fluorene copolymerized polyester resin had a composition as follows:
fluorene copolymerized polyester resin (A-3): 100 parts (10.000 wt %)
water: 829.86 parts (82.986 wt %)
ammonia: 0.14 parts (0.014 wt %)
butyl cellosolve: 70 parts (7.000 wt %).

Reference Example 19

Preparation of Fluorene Copolymerized Polyester Resin (A-4)

According to the undermentioned copolymerization composition, ester interchange reaction and condensation polymerization were carried out by the same procedure as for the polyester resin (A-1) to produce a polyester resin (A-4). The polyester resin had a Tg of 94° C. The copolymerized quantity of the glycol component (Ab-1) having a fluorene backbone in the fluorene copolymerized polyester resin (A-4) is 40 mol % relative to the total quantity (100 mol %) of the dicarboxylic acid component (Aa) and the glycol component (Ab). The fluorene copolymerized polyester resin (A-4) is a polyester resin that does not contain the dicarboxylic acid component (Aa-3) having a sulfonate group.
93 parts by mole of dimethyl succinate as the dicarboxylic acid component (Aa-2) free of a fluorene backbone
80 parts by mole of 9,9-bis[4-(2-hydroxy ethoxy)phenyl] fluorene as the glycol component (Ab-1) having a fluorene backbone
20 parts by mole of ethylene glycol as the glycol component (Ab-2) free of a fluorene backbone
7 parts by mole of 5-(2,5-dioxotetrahydrofurfuryl)-3-methyl-3-cyclohexene-1,2-dicarboxylic anhydride as the trivalent or higher-valent carboxylic acid component (Aa-4)

Reference Example 20

Preparation of f Water Dispersion (A-4-aq) of Fluorene Copolymerized Polyester Resin (A-4)

Water was dispersed by the same procedure as for the fluorene copolymerized polyester resin (A-3) to produce a water dispersion (A-4-aq) of a fluorene copolymerized polyester resin.

The water dispersion (A-4-aq) of a fluorene copolymerized polyester resin had a composition as follows:
fluorene copolymerized polyester resin (A-4): 100 parts (10.000 wt %)
water: 829.86 parts (82.986 wt %)
ammonia: 0.14 parts (0.014 wt %)
butyl cellosolve: 70 parts (7.000 wt %).

Reference Example 21

Preparation of Fluorene Copolymerized Polyester Resin (A-5)

According to the undermentioned copolymerization composition, ester interchange reaction and condensation polymerization were carried out by the same procedure as for the polyester resin (A-1) to produce a polyester resin (A-5). The polyester resin had a Tg of 90° C. The copolymerized quantity of the glycol component (Ab-1) having a fluorene backbone in the fluorene copolymerized polyester resin (A-5) is 40 mol % relative to the total quantity (100 mol %) of the dicarboxylic acid component (Aa) and the glycol component (Ab). The fluorene copolymerized polyester resin (A-5) is a polyester resin that does not contain the dicarboxylic acid component (Aa-3) having a sulfonate group.
25 parts by mole of dimethyl sebacate and 25 parts by mole of dimethyl succinate as the dicarboxylic acid component (Aa-2) free of a fluorene backbone
80 parts by mole of 9,9-bis[4-(2-hydroxy ethoxy)phenyl] fluorene as the glycol component (Ab-1) having a fluorene backbone
20 parts by mole of ethylene glycol as the glycol component (Ab-2) free of a fluorene backbone
50 parts by mole of trimellitic acid as the trivalent or higher-valent carboxylic acid component (Aa-4)

Reference Example 22

Preparation of Water Dispersion (A-5aq) of Fluorene Copolymerized Polyester Resin (A-5)

Water was dispersed by the same procedure as for the fluorene copolymerized polyester resin (A-3) to produce a water dispersion (A-5aq) of a fluorene copolymerized polyester resin.

The water dispersion (A-5aq) of a fluorene copolymerized polyester resin had a composition as follows:
fluorene copolymerized polyester resin (A-5): 100 parts (14.993 wt %)
water: 533.1 parts (79.925 wt %)
ammonia: 0.5 parts (0.075 wt %)
butyl cellosolve: 33.4 parts (5.007 wt %).

Reference Example 23

Preparation of Water Dispersion (C-3aq) of Amorphous Silica

A water dispersion (KEW30, supplied by Nippon Shokubai Co., Ltd.) containing 20 wt % of amorphous silica was diluted with water for adjustment to the undermentioned composition, thereby producing an water dispersion (C-3aq) of amorphous silica:
amorphous silica: 5 wt %
water: 95 wt %.

Example 1

PET pellets (with an intrinsic viscosity of 0.63 dl/g) virtually free of particles add externally, used to form the layer S, were vacuum-dried sufficiently, supplied to an extruder, melted at 285° C., extruded through a T-form orifice to form a sheet, and wound up on a mirror finished casting drum with a surface temperature of 25° C. by the static electricity-applying casting technique to cool and solidify the sheet. The resulting unstretched film was heated at 90° C., and stretched 3.4 times in the length direction to produce a uniaxially oriented (uniaxially stretched) film. This film was subjected to corona discharge treatment in air.

Subsequently, various water dispersions prepared in Reference Examples above were mixed according to the proportions given below to produce aqueous coating agents to be used to form the layer C. The resulting aqueous coating agents were spread over the corona discharge-treated surface of the uniaxially stretched film.
(Composition of Aqueous Coating Agent)
    water dispersion (A-1aq) of fluorene copolymerized polyester resin: 33.333 wt %
    water dispersion (C-1aq) of colloidal silica: 1.000 wt %
    water dispersion (D-1aq) of surface active agent: 2.000 wt %
    water: 63.667 wt %

The components of the aqueous coating agent accounted for the following percentages by weight:
    fluorene copolymerized polyester resin (A-1): 4.975 wt %
    ammonia: 0.025 wt %
    colloidal silica: 0.050 wt %
    acetylene diol-based surface active agent: 0.100 wt %
    water: 93.183 wt %
    butyl cellosolve: 1.667 wt %.

The uniaxially stretched film was coated with an aqueous coating agent, held with a clip, supplied to a preheating zone, dried at an atmospheric temperature of 75° C., further heated to 110° C. with a radiation heater, dried again at 90° C., immediately stretched continuously 3.5 times in the width direction in a heating zone of 120° C., and heat-treated for 20 seconds in a heating zone of 220° C., thereby producing a laminated polyester film consisting of the layer C formed over the fully crystal-oriented layer S. This laminated polyester film had a thickness of 100 μm, and the layer C had a thickness of 100 nm. Characteristics of the resulting laminated polyester film are shown in Table below. The film had good quality in terms of the interference pattern, initial adhesive property, and adhesive index after a heat and wet test.

Example 2

Except for using an aqueous coating agent having the undermentioned composition, the same procedures as in Example 1 was carried out to produce a laminated film. This laminated film had a thickness of 100 μm, and the layer C had a thickness of 100 nm.
(Composition of Aqueous Coating Agent)
    water dispersion (A-1aq) of fluorene copolymerized polyester resin: 31.667 wt %
    water dispersion (B-1aq) of methylol group-containing melamine cross linking agent: 1.000 wt %
    water dispersion (C-1aq) of colloidal silica: 1.000 wt %
    water dispersion (D-1aq) of surface active agent: 2.000 wt %
    water: 64.333 wt %

The components of the aqueous coating agent accounted for the following percentages by weight:
    fluorene copolymerized polyester resin (A-1): 4.726 wt %
    ammonia: 0.024 wt %
    methylol group-containing melamine cross linking agent (B-1): 0.250 wt %
    colloidal silica: 0.050 wt %
    acetylene diol-based surface active agent: 0.100 wt %
    water: 93.267 wt %
    butyl cellosolve: 1.583 wt %.

Characteristics of this laminated film are shown in Table below. It was found that the addition of the cross linking agent (B) acted to improve the coating properties. The quality was good in terms of the interference pattern, and excellent in terms of the initial adhesive property and adhesive index after a heat and wet test.

Example 3

Except for using an aqueous coating agent having the undermentioned composition, the same procedures as in Example 1 was carried out to produce a laminated film. This laminated film had a thickness of 100 μm, and the layer C had a thickness of 100 nm. Characteristics of this laminated film are shown in Table 2 below. The quality was good in terms of the interference pattern, and excellent in terms of the initial adhesive property and adhesive index after a heat and wet test.
(Composition of Aqueous Coating Agent)
    water dispersion (A-1aq) of fluorene copolymerized polyester resin: 23.333 wt %
    water dispersion (B-1aq) of methylol group-containing melamine cross linking agent: 6.000 wt %
    water dispersion (C-1aq) of colloidal silica: 1.000 wt %
    water dispersion (D-1aq) of surface active agent: 2.000 wt %
    water: 67.667 wt %

The components of the aqueous coating agent accounted for the following percentages by weight:
    fluorene copolymerized polyester resin (A-1): 3.483 wt %
    ammonia: 0.017 wt %
    methylol group-containing melamine cross linking agent (B-1): 1.500 wt %
    colloidal silica: 0.050 wt %
    acetylene diol-based surface active agent: 0.100 wt %
    water: 93.683 wt %
    butyl cellosolve: 1.167 wt %.

Example 4

Except for using an aqueous coating agent having the undermentioned composition, the same procedures as in Example 1 was carried out to produce a laminated film. This laminated film had a thickness of 100 μm, and the layer C had a thickness of 100 nm. Characteristics of this laminated film are shown in Table below. The quality was at a practical use level in terms of the interference pattern, but excellent in terms of the initial adhesive property and the adhesive index after a heat and wet test.
(Composition of Aqueous Coating Agent)
    water dispersion (A-1aq) of fluorene copolymerized polyester resin: 21.667 wt %
    water dispersion (B-1aq) of methylol group-containing melamine cross linking agent: 7.000 wt %
    water dispersion (C-1aq) of colloidal silica: 1.000 wt %
    water dispersion (D-1aq) of surface active agent: 2.000 wt %
    water: 68.333 wt %

The components of the aqueous coating agent accounted for the following percentages by weight:
    fluorene copolymerized polyester resin (A-1): 3.234 wt %
    ammonia: 0.016 wt %
    methylol group-containing melamine cross linking agent (B-1): 1.750 wt %
    colloidal silica: 0.050 wt %
    acetylene diol-based surface active agent: 0.100 wt %
    water: 93.767 wt %
    butyl cellosolve: 1.083 wt %.

Example 5

Except for using an aqueous coating agent having the undermentioned composition, the same procedures as in Example 1 was carried out to produce a laminated film. This laminated film had a thickness of 100 μm, and the layer C had a thickness of 20 nm. Characteristics of this laminated film are shown in Table below. The coating thickness was optimized, and as a result, the quality was excellent in terms of the interference pattern, initial adhesive property, and adhesive index after a heat and wet test.

(Composition of Aqueous Coating Agent)
water dispersion (A-1aq) of fluorene copolymerized polyester resin: 6.333 wt %
water dispersion (B-1aq) of methylol group-containing melamine cross linking agent: 0.200 wt %
water dispersion (C-2aq) of colloidal silica: 1.500 wt %
water dispersion (D-1aq) of surface active agent: 2.000 wt %
water: 89.967 wt %

The components of the aqueous coating agent accounted for the following percentages by weight:
fluorene copolymerized polyester resin (A-1): 0.945 wt %
ammonia: 0.005 wt %
methylol group-containing melamine cross linking agent (B-1): 0.050 wt %
colloidal silica: 0.075 wt %
acetylene diol-based surface active agent: 0.100 wt %
water: 98.508 wt %
butyl cellosolve: 0.317 wt %.

Example 6

Except for using an aqueous coating agent having the undermentioned composition, the same procedures as in Example 1 was carried out to produce a laminated film. This laminated film had a thickness of 100 μm, and the layer C had a thickness of 2 nm. Characteristics of this laminated film are shown in Table below. The quality was excellent in terms of the interference pattern, initial adhesive property, and adhesive index after a heat and wet test.

(Composition of Aqueous Coating Agent)
water dispersion (A-1aq) of fluorene copolymerized polyester resin: 0.6333 wt %
water dispersion (B-1aq) of methylol group-containing melamine cross linking agent: 0.0200 wt %
water dispersion (C-2aq) of colloidal silica: 0.1500 wt %
water dispersion (D-1aq) of surface active agent: 2.0000 wt %
water: 97.1967 wt %

The components of the aqueous coating agent accounted for the following percentages by weight:
fluorene copolymerized polyester resin (A-1): 0.0945 wt %
ammonia: 0.0005 wt %
methylol group-containing melamine cross linking agent (B-1): 0.0050 wt %
colloidal silica: 0.0075 wt %
acetylene diol-based surface active agent: 0.1000 wt %
water: 99.7606 wt %
butyl cellosolve: 0.0317 wt %.

Example 7

Except for using an aqueous coating agent having the undermentioned composition, the same procedures as in Example 1 was carried out to produce a laminated film. This laminated film had a thickness of 100 μm, and the layer C had a thickness of 1 nm. Characteristics of this laminated film are shown in Table below. The quality was excellent in terms of the interference pattern, but at a practical use level in terms of the initial adhesive property, and adhesive index after a heat and wet test.

(Composition of Aqueous Coating Agent)
water dispersion (A-1aq) of fluorene copolymerized polyester resin: 0.3167 wt %
water dispersion (B-1aq) of methylol group-containing melamine cross linking agent: 0.0100 wt %
water dispersion (C-2aq) of colloidal silica: 0.0750 wt %
water dispersion (D-1aq) of surface active agent: 2.000 wt %
water: 97.5983 wt %

The components of the aqueous coating agent accounted for the following percentages by weight:
fluorene copolymerized polyester resin (A-1): 0.0473 wt %
ammonia: 0.0002 wt %
methylol group-containing melamine cross linking agent (B-1): 0.0025 wt %
colloidal silica: 0.0038 wt %
acetylene diol-based surface active agent: 0.1000 wt %
water: 99.8304 wt %
butyl cellosolve: 0.0158 wt %.

Example 8

Except for using an aqueous coating agent having the undermentioned composition, the same procedures as in Example 1 was carried out to produce a laminated film. This laminated film had a thickness of 100 μm, and the layer C had a thickness of 20 nm. Characteristics of this laminated film are shown in Table below. The quality was excellent in terms of the interference pattern, initial adhesive property, and adhesive index after a heat and wet test.

(Composition of Aqueous Coating Agent)
water dispersion (A-1aq) of fluorene copolymerized polyester resin: 6.333 wt %
water dispersion (B-2aq) of oxazoline-based cross linking agent: 0.500 wt %
water dispersion (C-2aq) of colloidal silica: 1.500 wt %
water dispersion (D-1aq) of surface active agent: 2.000 wt %
water: 89.667 wt %

The components of the aqueous coating agent accounted for the following percentages by weight:
fluorene copolymerized polyester resin (A-1): 0.945 wt %
ammonia: 0.005 wt %
oxazoline-based cross linking agent (B-2): 0.050 wt %
colloidal silica: 0.075 wt %
acetylene diol-based surface active agent: 0.100 wt %
water: 98.508 wt %
butyl cellosolve: 0.317 wt %.

Example 9

Except for using an aqueous coating agent having the undermentioned composition, the same procedures as in Example 1 was carried out to produce a laminated film. This laminated film had a thickness of 100 μm, and the layer C had a thickness of 20 nm. Characteristics of this laminated film are shown in Table below. The quality was excellent in terms of the interference pattern, initial adhesive property, and adhesive index after a heat and wet test.

(Composition of Aqueous Coating Agent)
water dispersion (A-1aq) of fluorene copolymerized polyester resin: 6.333 wt % water dispersion (B-3aq) of carbodiimide-based cross linking agent: 0.500 wt %
water dispersion (C-2aq) of colloidal silica: 1.500 wt %
water dispersion (D-1aq) of surface active agent: 2.000 wt %
water: 89.667 wt %

The components of the aqueous coating agent accounted for the following percentages by weight:
fluorene copolymerized polyester resin (A-1): 0.945 wt %
ammonia: 0.005 wt %
carbodiimide-based cross linking agent (B-3): 0.050 wt %
colloidal silica: 0.075 wt %
acetylene diol-based surface active agent: 0.100 wt %
water: 98.508 wt %
butyl cellosolve: 0.317 wt %.

Example 10

Except for using an aqueous coating agent having the undermentioned composition, the same procedures as in Example 1 was carried out to produce a laminated film. This laminated film had a thickness of 100 μm, and the layer C had a thickness of 200 nm. Characteristics of this laminated film are shown in Table below. The quality was at a practical use level in terms of the interference pattern, but excellent in terms of the initial adhesive property and the adhesive index after a heat and wet test.
(Composition of Aqueous Coating Agent)
water dispersion (A-1aq) of fluorene copolymerized polyester resin: 63.333 wt %
water dispersion (B-1aq) of methylol group-containing melamine cross linking agent: 2.000 wt %
water dispersion (C-3aq) of amorphous silica: 2.000 wt %
water dispersion (D-1aq) of surface active agent: 2.000 wt %
water: 30.667 wt %

The components of the aqueous coating agent accounted for the following percentages by weight:
fluorene copolymerized polyester resin (A-1): 9.452 wt %
ammonia: 0.048 wt %
methylol group-containing melamine cross linking agent (B-1): 0.500 wt %
amorphous silica: 0.100 wt %
acetylene diol-based surface active agent: 0.100 wt %
water: 86.633 wt %
butyl cellosolve: 3.167 wt %.

Example 11

Except for using an aqueous coating agent having the undermentioned composition, the same procedures as in Example 1 was carried out to produce a laminated film. This laminated film had a thickness of 100 μm, and the layer C had a thickness of 30 nm. Characteristics of this laminated film are shown in Table below. The quality was good in terms of the interference pattern, and excellent in terms of the initial adhesive property and the adhesive index after a heat and wet test.
(Composition of Aqueous Coating Agent)
water dispersion (A-1aq) of fluorene copolymerized polyester resin: 9.500 wt %
water dispersion (B-1aq) of methylol group-containing melamine cross linking agent: 0.300 wt %
water dispersion (C-2aq) of colloidal silica: 2.25 wt %
water dispersion (D-1aq) of surface active agent: 2.000 wt %
water: 85.950 wt %

The components of the aqueous coating agent accounted for the following percentages by weight:
fluorene copolymerized polyester resin (A-1): 1.418 wt %
ammonia: 0.007 wt %
methylol group-containing melamine cross linking agent (B-1): 0.075 wt %
colloidal silica: 0.113 wt %
acetylene diol-based surface active agent: 0.100 wt %
water: 97.812 wt %
butyl cellosolve: 0.475 wt %.

Example 12

Except for using an aqueous coating agent having the undermentioned composition, the same procedures as in Example 1 was carried out to produce a laminated film. This laminated film had a thickness of 100 μm, and the layer C had a thickness of 20 nm. Characteristics of this laminated film are shown in Table below. The quality was excellent in terms of the interference pattern, initial adhesive property, and adhesive index after a heat and wet test.
(Composition of Aqueous Coating Agent)
water dispersion (A-3aq) of fluorene copolymerized polyester resin: 9.500 wt %
water dispersion (B-1aq) of methylol group-containing melamine cross linking agent: 0.200 wt %
water dispersion (C-2aq) of colloidal silica: 1.500 wt %
water dispersion (D-1aq) of surface active agent: 2.000 wt %
water: 86.800 wt %

The components of the aqueous coating agent accounted for the following percentages by weight:
fluorene copolymerized polyester resin (A-3): 0.949 wt %
ammonia: 0.001 wt %
methylol group-containing melamine cross linking agent (B-1): 0.050 wt %
colloidal silica: 0.075 wt %
acetylene diol-based surface active agent: 0.100 wt %
water: 98.160 wt %
butyl cellosolve: 0.665 wt %.

Example 13

Except for using an aqueous coating agent having the undermentioned composition, the same procedures as in Example 1 was carried out to produce a laminated film. This laminated film had a thickness of 100 μm, and the layer C had a thickness of 20 nm. Characteristics of this laminated film are shown in Table below. The quality was excellent in terms of the interference pattern, initial adhesive property, and adhesive index after a heat and wet test.
(Composition of Aqueous Coating Agent)
water dispersion (A-4-aq) of fluorene copolymerized polyester resin: 9.500 wt %
water dispersion (B-1aq) of methylol group-containing melamine cross linking agent: 0.200 wt %
water dispersion (C-2aq) of colloidal silica: 1.500 wt %
water dispersion (D-1aq) of surface active agent: 2.000 wt %
water: 86.800 wt %

The components of the aqueous coating agent accounted for the following percentages by weight:
fluorene copolymerized polyester resin (A-4): 0.949 wt %
ammonia: 0.001 wt %
methylol group-containing melamine cross linking agent (B-1): 0.050 wt %
colloidal silica: 0.075 wt % acetylene diol-based surface active agent: 0.100 wt %
water: 98.160 wt %
butyl cellosolve: 0.665 wt %.

Example 14

Except for using an aqueous coating agent having the undermentioned composition, the same procedures as in Example 1 was carried out to produce a laminated film. This laminated film had a thickness of 100 µm, and the layer C had a thickness of 100 nm. Characteristics of this laminated film are shown in Table below. The quality was good in terms of the interference pattern, but at a practical use level in terms of the initial adhesive property and the adhesive index after a heat and wet test.
(Composition of Aqueous Coating Agent)
 water dispersion (A-5aq) of fluorene copolymerized polyester resin: 33.333 wt %
 water dispersion (C-1aq) of colloidal silica: 1.000 wt %
 water dispersion (D-1aq) of surface active agent: 2.000 wt %
 water: 63.667 wt %
The components of the aqueous coating agent accounted for the following percentages by weight:
 fluorene copolymerized polyester resin (A-5): 4.975 wt %
 ammonia: 0.025 wt %
 colloidal silica: 0.050 wt %
 acetylene diol-based surface active agent: 0.100 wt %
 water: 93.183 wt %
 butyl cellosolve: 1.667 wt %.

Example 15

A paint of the undermentioned composition was spread over the surface of the layer C of the laminated polyester film prepared in Example 2 by the reverse coating method using a small-diameter gravure roll, and dried at 90° C.
After the drying step, the specimen was irradiated with ultraviolet light from a light-gathering high pressure mercury lamp (H03-L31, supplied by Eye Graphics Co., Ltd.) with an irradiation intensity of 120 W/cm, installed at a 9 cm height above the surface of the layer C, so that the integrated irradiation intensity would be 400 mJ/cm$^2$. It was then cured to form a high refractive index hard coat layer with a thickness of 2 µm. An industrial UV checker (UVR-N1, supplied by Japan Storage Battery Co., Ltd.) was used to measure the integrated irradiation intensity of the ultraviolet light. The high refractive index hard coat layer had a refractive index of 1.67.
(Paint for Formation of High Refractive Index Hard Coat Layer)
 paint produced by adding Peltron XJC-0357 (fine arsenic pentoxide particles with an average particle diameter of 30 nm/urethane acrylate, supplied by Pelnox Corp.) (refractive index 1.67) to an organic solvent of the undermentioned composition up to a solids content of 40 wt %.
 organic solvent (composition: propylene glycol monomethyl ether/methyl isobutyl ketone/isopropyl alcohol/acetylacetone/toluene=58 wt %/19 wt %/19 wt %/3 wt %/1 wt %).
Then, the paint with a low refractive index as described below was spread over the high refractive index hard coat layer by the reverse coating method using a small-diameter gravure roll, and dried at 90° C.
After the drying step, the specimen was irradiated with ultraviolet light from a light-gathering high pressure mercury lamp (H03-L31, supplied by Eye Graphics Co., Ltd.) with an irradiation intensity of 120 W/cm, installed at a 9 cm height above the surface of the layer C, so that the integrated irradiation intensity would be 400 mJ/cm$^2$. It was then cured to form a high refractive index hard coat layer with a thickness of about 100 nm, thereby producing an antireflection film. The low refractive index layer had a refractive index of 1.37.
(Low Refractive Index Paint)
 paint produced by adding TU2180 (fluorine-based polymer/polyfunctional (meth)acrylate compound/fine silica particles, supplied by JSR Corporation) (refractive index 1.37) to an organic solvent of the undermentioned composition up to a solids content of 3 wt %.
 organic solvent (composition: methyl isobutyl ketone/methyl ethyl ketone/isopropyl alcohol/propylene glycol monobutyl ether=90 wt %/2 wt %/2 wt %/6 wt %).
The quality of the resulting antireflection film was good in terms of the interference pattern and excellent in terms of the initial contact.

Example 16

Except for using the laminated polyester film prepared in Example 5 the same procedure as in Example 15 was carried out to produce an antireflection film. The quality of the resulting antireflection film was good in terms of the interference pattern and excellent in terms of the initial contact.

Example 17

Except for using the laminated polyester film prepared in Example 11 the same procedure as in Example 15 was carried out to produce an antireflection film. The quality of the resulting antireflection film was good in terms of the interference pattern and excellent in terms of the initial contact.

Comparative Example 1

Except for using an aqueous coating agent having the undermentioned composition, the same procedures as in Example 1 was carried out to produce a laminated film. This laminated film had a thickness of 100 µm, and the layer C had a thickness of 100 nm. Characteristics of this laminated film are shown in Table below. The polyester resin was not copolymerized with a component having a fluorene backbone and, accordingly, the layer C did not have a sufficiently high refractive index, leading to a serious interference pattern.
(Composition of Aqueous Coating Agent)
 water dispersion (P-1aq) of polyester resin: 19.000 wt %
 water dispersion (B-1aq) of methylol group-containing melamine cross linking agent: 1.000 wt %
 water dispersion (C-1aq) of colloidal silica: 1.000 wt %
 water dispersion (D-1aq) of surface active agent: 2.000 wt %
 water: 77.000 wt %
The components of aqueous coating agent accounted for the following percentages by weight:
 fluorene copolymerized polyester resin (P-1): 4.703 wt %
 ammonia: 0.047 wt %
 methylol group-containing melamine cross linking agent (B-1): 0.250 wt %
 colloidal silica: 0.050 wt %
 acetylene diol-based surface active agent: 0.100 wt %
 water: 94.850 wt %.

Comparative Example 2

Except for using an aqueous coating agent having the undermentioned composition, the same procedures as in Example 1 was carried out to produce a laminated film. This laminated film had a thickness of 100 μm, and the layer C had a thickness of 100 nm. Characteristics of this laminated film are shown in Table below. The polyester resin was not copolymerized with a component having a fluorene backbone and, accordingly, the layer C did not have a sufficiently high refractive index, leading to a serious interference pattern. In addition, the polyester resin contained the dicarboxylic acid component (Aa-3) having a sulfonate group, leading to an insufficient adhesive index after a heat and wet test.
(Composition of Aqueous Coating Agent)
  water dispersion (P-2aq) of polyester resin: 19.00 wt %
  water dispersion (B-1aq) of methylol group-containing melamine cross linking agent: 1.00 wt %
  water dispersion (C-1aq) of colloidal silica: 1.00 wt %
  water dispersion (D-1aq) of surface active agent: 2.00 wt %
  water: 77.000 wt %
The components of the aqueous coating agent accounted for the following percentages by weight:
  fluorene copolymerized polyester resin (P-2): 4.75 wt %
  methylol group-containing melamine cross linking agent (B-1): 0.25 wt %
  colloidal silica: 0.05 wt %
  acetylene diol-based surface active agent: 0.10 wt %
  water: 94.850 wt %.

Comparative Example 3

Except for using an aqueous coating agent having the undermentioned composition, the same procedures as in Example 1 was carried out to produce a laminated film. This laminated film had a thickness of 100 μm, and the layer C had a thickness of 100 nm. Characteristics of this laminated film are shown in Table below. The polyester resin was not copolymerized with a component having a fluorene backbone and, accordingly, the layer C did not have a sufficiently high refractive index, leading to a serious interference pattern. In addition, the polyester resin contained the dicarboxylic acid component (Aa-3) having a sulfonate group, leading to an insufficient adhesive index after a heat and wet test.
(Composition of Aqueous Coating Agent)
  water dispersion (P-3aq) of polyester resin: 47.50 wt %
  water dispersion (B-1aq) of methylol group-containing melamine cross linking agent: 1.00 wt %
  water dispersion (C-1aq) of colloidal silica: 1.00 wt %
  water dispersion (D-1aq) of surface active agent: 2.00 wt %
  water: 48.50 wt %
The components of the aqueous coating agent accounted for the following percentages by weight:
  fluorene copolymerized polyester resin (P-3): 4.750 wt %
  methylol group-containing melamine cross linking agent (B-1): 0.250 wt %
  colloidal silica: 0.050 wt %
  acetylene diol-based surface active agent: 0.100 wt %
  water: 92.475 wt %
  butyl cellosolve: 2.375 wt %.

Comparative Example 4

Except for using an aqueous coating agent having the undermentioned composition, the same procedures as in Example 1 was carried out to produce a laminated film. This laminated film had a thickness of 100 μm, and the layer C had a thickness of 100 nm. Characteristics of this laminated film are shown in Table below. The quality was good in terms of the interference pattern, but insufficient in terms of the adhesive index after a heat and wet test as the polyester resin contained the dicarboxylic acid component (Aa-3) having a sulfonate group.
(Composition of Aqueous Coating Agent)
  water dispersion (A-2aq) of polyester resin: 47.50 wt %
  water dispersion (B-1aq) of methylol group-containing melamine cross linking agent: 1.00 wt %
  water dispersion (C-1aq) of colloidal silica: 1.00 wt %
  water dispersion (D-1aq) of surface active agent: 2.00 wt %
  water: 48.50 wt %
The components of the aqueous coating agent accounted for the following percentages by weight:
  fluorene copolymerized polyester resin (A-2): 4.750 wt %
  methylol group-containing melamine cross linking agent (B-1): 0.250 wt %
  colloidal silica: 0.050 wt %
  acetylene diol-based surface active agent: 0.100 wt %
  water: 92.475 wt %
  butyl cellosolve: 2.375 wt %.

TABLE 1

| | Layer C | | | | | |
|---|---|---|---|---|---|---|
| | Polyester resin | | Cross linking agent (B) | | | |
| | Type | Content (a) (parts by weight) | Type | Content (b) (parts by weight) | (a)/(b) (—) | Layer thickness (nm) |
| Example 1 | A-1 | 100 | — | — | — | 100 |
| Example 2 | A-1 | 95 | B-1 | 5 | 95/5 | 100 |
| Example 3 | A-1 | 70 | B-1 | 30 | 70/30 | 100 |
| Example 4 | A-1 | 65 | B-1 | 35 | 65/35 | 100 |
| Example 5 | A-1 | 95 | B-1 | 5 | 95/5 | 20 |
| Example 6 | A-1 | 95 | B-1 | 5 | 95/5 | 2 |
| Example 7 | A-1 | 95 | B-1 | 5 | 95/5 | 1 |
| Example 8 | A-1 | 95 | B-2 | 5 | 95/5 | 20 |
| Example 9 | A-1 | 95 | B-3 | 5 | 95/5 | 20 |
| Example 10 | A-1 | 95 | B-1 | 5 | 95/5 | 200 |
| Example 11 | A-1 | 95 | B-1 | 5 | 95/5 | 30 |
| Example 12 | A-3 | 95 | B-1 | 5 | 95/5 | 20 |
| Example 13 | A-4 | 95 | B-1 | 5 | 95/5 | 20 |
| Example 14 | A-5 | 100 | — | — | — | 100 |
| Comparative Example 1 | P-1 | 95 | B-1 | 5 | 95/5 | 100 |
| Comparative Example 2 | P-2 | 95 | B-1 | 5 | 95/5 | 100 |

TABLE 1-continued

| | Layer C | | | | | |
|---|---|---|---|---|---|---|
| | Polyester resin | | Cross linking agent (B) | | | |
| | Type | Content (a) (parts by weight) | Type | Content (b) (parts by weight) | (a)/(b) (—) | Layer thickness (nm) |
| Comparative Example 3 | P-3 | 95 | B-1 | 5 | 95/5 | 100 |
| Comparative Example 4 | A-2 | 95 | B-1 | 5 | 95/5 | 100 |

TABLE 2

| | Spectral reflectivity (%) | Interference pattern | Initial adhesive property | Adhesive index after a heat and wet test |
|---|---|---|---|---|
| Example 1 | 6.9 | A | A | 4 |
| Example 2 | 6.8 | A | S | 5 |
| Example 3 | 6 | A | S | 5 |
| Example 4 | 5.9 | B | S | 5 |
| Example 5 | 7.4 | S | S | 5 |
| Example 6 | 7.5 | S | S | 5 |
| Example 7 | 7.5 | S | B | 3 |
| Example 8 | 7.4 | S | S | 5 |
| Example 9 | 7.4 | S | S | 5 |
| Example 10 | 5.8 | B | S | 5 |
| Example 11 | 6.8 | A | S | 5 |
| Example 12 | 7.3 | S | S | 5 |
| Example 13 | 7.3 | S | S | 5 |
| Example 14 | 6.8 | A | B | 3 |
| Comparative Example 1 | 5.2 | C | A | 4 |
| Comparative Example 2 | 5.2 | C | A | 1 |
| Comparative Example 3 | 5.2 | C | A | 2 |
| Comparative Example 4 | 6.9 | A | A | 2 |

TABLE 3

| | Interference pattern in antireflection film | Initial adhesive property of antireflection film |
|---|---|---|
| Example 15 | A | S |
| Example 16 | A | S |
| Example 17 | A | S |

Industrial Applicability

The laminated polyester film comprises a layer (layer S) of polyester and a layer (layer C) containing a polyester resin (A) having a fluorene backbone wherein the surface of layer C has an adhesive index after a heat and wet test in the range of 3 or more and 5 or less. Accordingly, the formation of an interference pattern on the hard coating agent composed of active line-cured resin is reduced, and strong adhesion with the hard coat layer is maintained under high temperature and high humidity conditions. Thus, it serves effectively as material for hard coating film, antireflection film produced by adding a low refractive index layer thereon, laminated film for touch panels produced by adding an electrically conductive metal oxide layer, laminated film for electronic paper, and laminated film for other display devices.

The invention claimed is:

1. A laminated polyester film comprising:
a layer (layer S) of polyester; and
a layer (layer C) comprising a polyester resin (A) having a fluorene backbone coated on a surface of layer S,
wherein 1) a surface of said layer C has an adhesive index after a heat and wet test of 3 to 5, 2) said polyester resin (A) either contains no dicarboxylic acid component having a sulfonate group or contains dicarboxylic acid component less than 0.1 mol % relative to the dicarboxylic acid component that constitutes the polyester resin (A) and 3) said polyester resin (A) contains a dicarboxylic acid component having a trivalent or higher-valent carboxylic acid component (Aa-4).

2. The film as specified in claim 1, wherein said layer C further comprises a cross linking agent (B) and a ratio of content (a) of the polyester resin (A) to content (b) of the cross linking agent (B) in the layer C ((a)/(b)) is 70/30 to 95/5.

3. The film as specified in claim 2, wherein the cross linking agent (B) is one or more cross linking agents selected from the group consisting of melamine-based cross linking agents, oxazoline-based cross linking agents, and carbodiimide-based cross linking agents.

4. The film as specified in claim 1, having a spectral reflectivity at a 550 nm wavelength of 6.0 to 8.3%.

5. The film as specified in claim 1, wherein said layer C has a layer thickness of 2 to 20 nm.

6. An antireflection film comprising a laminated polyester film as specified in claim 1, laminated with a high refractive index hard coat layer of an active line-cured resin, and a low refractive index layer formed on top thereof, wherein the high refractive index hard coat layer has a refractive index of 1.63 to 1.75 and the low refractive index layer has a refractive index of 1.35 to 1.40.

7. The film as specified in claim 2, having a spectral reflectivity at a 550 nm wavelength of 6.0 to 8.3%.

8. The film as specified in claim 3, having a spectral reflectivity at a 550 nm wavelength of 6.0 to 8.3%.

9. The film as specified in claim 2, wherein said layer C has a layer thickness of 2 to 100 nm.

10. The film as specified in claim 3, wherein said layer C has a layer thickness of 2 to 100 nm.

11. The film as specified in claim 4, wherein said layer C has a layer thickness of 2 to 100 nm.

12. An antireflection film comprising a laminated polyester film as specified in claim 2, laminated with a high refractive index hard coat layer of an active line-cured resin, and a low refractive index layer formed on top thereof.

13. The film as specified in claim 1, wherein the trivalent or higher-valent carboxylic acid component (Aa-4) is a tetracarboxylic acid.

14. The film as specified in claim 1, wherein a laminated polyester film consisting of the layer S laminated with the layer C is produced in one step.

* * * * *